United States Patent [19]

Kagawa et al.

[11] Patent Number: 5,648,107
[45] Date of Patent: Jul. 15, 1997

[54] POROUS FILM MANUFACTURING APPARATUS

[75] Inventors: Seiji Kagawa; Yoichiro Kagawa, both of Kawaguchi, Japan

[73] Assignee: Seiji Kagawa, Kawaguchi, Japan

[21] Appl. No.: 319,177

[22] Filed: Oct. 6, 1994

[30] Foreign Application Priority Data

Oct. 15, 1993 [JP] Japan ............................... 5-258637

[51] Int. Cl.⁶ ......................... B28B 3/12; B28B 11/10
[52] U.S. Cl. ...................... 425/363; 264/284; 264/293; 264/316; 425/385; 425/394
[58] Field of Search ........................... 425/367, 385, 425/369, 363, 394; 264/284, 285, 286, 293, 316

[56] References Cited

U.S. PATENT DOCUMENTS

| 2,839,785 | 6/1958 | Stevens | 425/385 |
|---|---|---|---|
| 3,027,595 | 4/1962 | Takin et al. | 264/284 |
| 3,060,515 | 10/1962 | Corbett | 425/385 |
| 3,718,059 | 2/1973 | Clayton | 83/867 |
| 3,795,163 | 3/1974 | Armstrong et al. | 83/30 |
| 4,130,623 | 12/1978 | Walter | 264/293 |
| 4,614,632 | 9/1986 | Kezuka et al. | 425/367 |
| 4,778,634 | 10/1988 | Douglas | 264/284 |
| 5,257,923 | 11/1993 | Kagawa | 425/367 |
| 5,312,569 | 5/1994 | Mezei | 425/385 |
| 5,352,108 | 10/1994 | Kagawa et al. | 425/367 |
| 5,415,538 | 5/1995 | Kagawa | 425/367 |

FOREIGN PATENT DOCUMENTS

| 0 516 094 | 12/1992 | European Pat. Off. |
|---|---|---|
| 0 538 713 | 4/1993 | European Pat. Off. |
| 0 784 902 | 7/1935 | France . |
| 2 047 167 | 3/1971 | France . |
| 2830402 | 1/1980 | Germany . |

OTHER PUBLICATIONS

Patent Abstracts of Japan, vol. 16, No. 141, 9 Apr. 1992 & JP-A-04 002 499, 7 Jan. 1992.

*Primary Examiner*—Jan H. Silbaugh
*Assistant Examiner*—Mark Eashoo
*Attorney, Agent, or Firm*—Kenyon & Kenyon

[57] ABSTRACT

A porous film manufacturing apparatus regularly forms a large number of non-through pores with a fine opening width of sub-μm to several tens μm at a high density in elongated films made of various materials, with almost no deterioration in the essential characteristics of the film materials. The apparatus includes a feed unit, a perforating unit including a first block having a surface on which a large number of diamond particles with acute corner portions are deposited, a second block having a surface on which a desired protruding pattern is formed, and an elastic organic polymer sheet arranged to cover at least the protruding pattern of the second block, the first and second blocks being arranged such that the particle-deposited surface of the first block and the organic polymer sheet oppose each other, and a pressurizing unit for moving the movable block toward the stationary block until the distance between projecting ends of the particles and the surface of a portion of the organic polymer sheet located on the protruding pattern becomes smaller than the thickness of the elongated film between the movable and stationary blocks, thereby pressing the acute corner portions of the particles into the elongated film in a region opposing the protruding pattern.

26 Claims, 10 Drawing Sheets

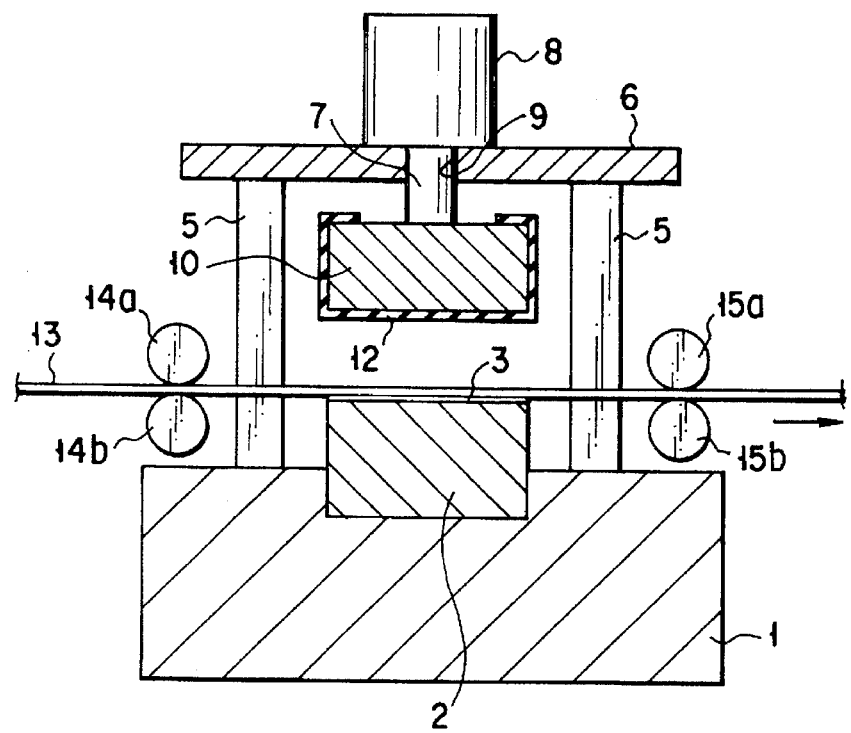
F I G. 1
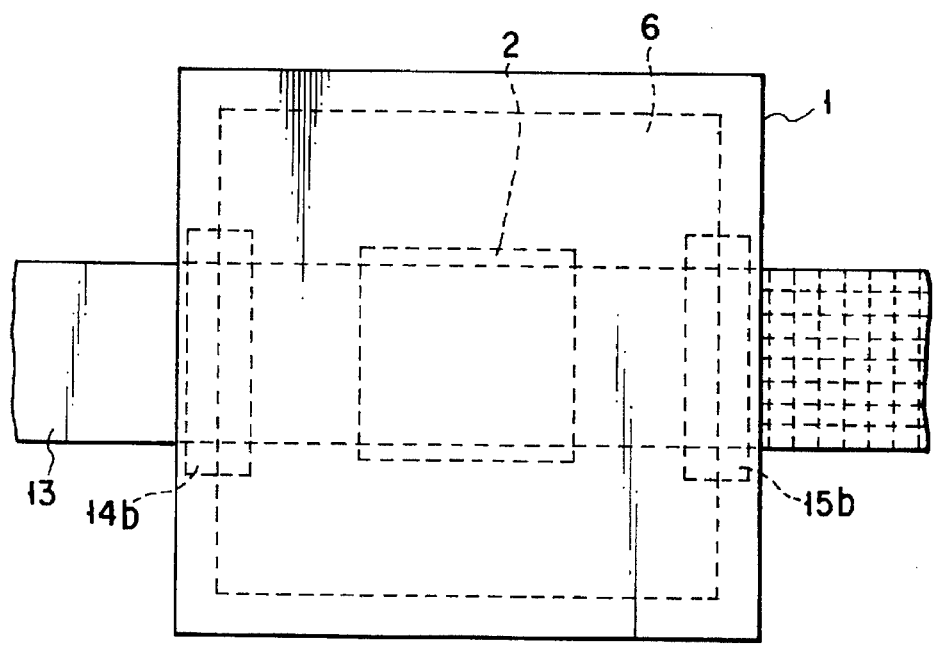
F I G. 2

POROUS FILM MANUFACTURING APPARATUS

BACKGROUND OF THE INVENTION

1. Field of the Invention

The present invention relates to a porous film manufacturing apparatus and, more particularly, to an apparatus for manufacturing porous films suitable for, e.g., an easily tearable film and a gas permeability-controlled film.

2. Description of the Related Art

French Patent 2073807 discloses a thermoplastic film fine perforation method including the steps of providing a pair of rolls which have a pinching portion between them and between which a fixed distance is held, applying abrasive particles on the surface of one of the rolls, passing a thermoplastic film through the pinching portion of the rolls, perforating the film with the abrasive particles by adjusting the pressure and the temperature of the pinching portion of the rolls, finely perforating the film with corner portions of the abrasive particles in contact with the film, and removing the finely perforated film from the pinching portion of the rolls. The abrasive particles on the surface of one of the pair of rolls are applied by bonding sandpaper, such as garnet type sandpaper, on the circumferential surface of the perforating roll. In this apparatus, however, if the pair of rolls are brought into contact with each other and a thermoplastic film is passed between the rolls, the garnet type sandpaper adhered as abrasive particles on the surface of one of the rolls is damaged by perforation in a short time period, since the strength of the sandpaper itself is low. As a result, it is difficult to continuously form through pores in thermoplastic films over long periods of time.

German Patent No. 2,830,402 discloses a method by which a large number of through pores are formed in a polyethylene or polypropylene film by passing the film through a pinching portion between a hard roll, which is covered with hard particles such as corundum particles or SiC particles, and a counter roll. According to this German Patent, the resultant film is applied to tea bags.

The applicant of the present invention, on the other hand, has previously filed a porous film manufacturing apparatus comprising: feed means for feeding an elongated film; a perforating unit including a first rotatable roll having a surface on which a large number of particles, each having acute corner portions and a Mohs hardness value of 5 or more, are deposited, and a second roll which is rotatable in a direction reverse to a rotating direction of the first roll, the first and second rolls being arranged to oppose each other and to cause the elongated film to pass therebetween, one of the rolls being stationary and the other roll being movable in a direction to oppose the one roll; and pressure control means, arranged near two end portions of the movable roll of the unit, for controlling a pressure applied from each of the rolls to the film. This manufacturing apparatus was filed in Japan and in various foreign countries including the United States and European countries, and is allowed as U.S. Pat. No. 5,257,923 (Nov. 2, 1993) in the United States and disclosed as European Patent Application No. 0,502,237 A1 by EPC.

This manufacturing apparatus can manufacture porous films in which through or non-through pores with a small size arbitrarily selected within the range of sub-μm to ten-odd μm are uniformly formed at a high density in elongated films made of various materials including polymeric materials and metals, with almost no deterioration in the essential characteristics of the film materials.

SUMMARY OF THE INVENTION

It is an object of the present invention to further improve the already filed porous film manufacturing apparatus and provide a porous film manufacturing apparatus capable of regularly forming a large number of non-through pores with a fine opening width of sub-μm to several tens μm at a high density in elongated films made of various materials including organic polymers and metals, with almost no deterioration in the essential characteristics of the film materials.

According to the present invention, there is provided a porous film manufacturing apparatus comprising:

feed means for feeding an elongated film;

a perforating unit including a first block having a surface on which a large number of particles with acute corner portions and a Mohs hardness of 5 or more are deposited, a second block having a surface on which a desired protruding pattern is formed, and an elastic organic polymer sheet so arranged as to cover at least the protruding pattern of the second block, the first and second blocks being arranged such that the particle-deposited surface of the first block and the organic polymer sheet oppose each other, one of the first and second blocks is stationary, and the other block is arranged to be movable toward the stationary block; and pressurizing means for moving the movable block toward the stationary block until the distance between projecting ends of the particles and the surface of a portion of the organic polymer sheet located on the protruding pattern becomes smaller than the thickness of the elongated film fed to a position between the movable and stationary blocks, thereby pressing the acute corner portions of the particles into the elongated film in a region opposing the protruding pattern.

According to the present invention, there is also provided a porous film manufacturing apparatus comprising:

feed means for feeding an elongated film;

a perforating unit including a first rotatable roll having a surface on which a large number of particles with acute corner portions and a Mohs hardness of 5 or more are deposited, a second roll having a circumferential surface on which a desired protruding pattern is formed and rotatable in a direction opposite to a rotating direction of the first roll, and an elastic organic polymer sheet so arranged as to cover at least the protruding pattern of the second roll, the first and second rolls being arranged to oppose each other; and pressurizing means for pressurizing the first and second rolls against each other so that the distance between projecting ends of the particles and the surface of a portion of the organic polymer sheet located on the protruding pattern becomes smaller than the thickness of the elongated film fed to a position between the first and second rolls, thereby pressing the acute corner portions of the particles into the elongated film in a region opposing the protruding pattern.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic sectional view showing a porous film manufacturing apparatus in the first embodiment of the present invention;

FIG. 2 is a bottom view of the manufacturing apparatus in FIG. 1;

DETAILED DESCRIPTION OF THE PREFERRED EMBODIMENTS

Figure 3:
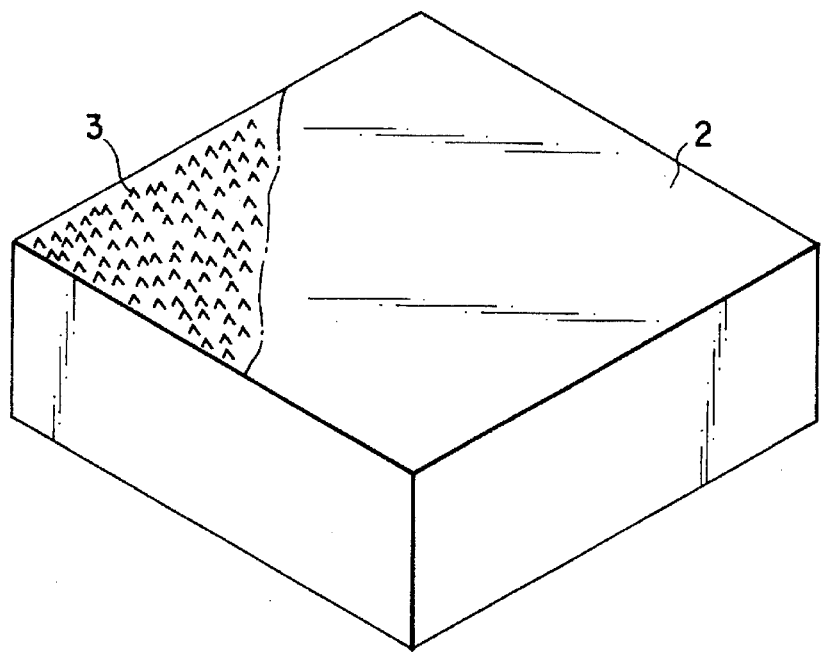
FIG. 3 is a perspective view showing a first block used in the manufacturing apparatus in FIG. 1.

A porous film manufacturing apparatus according to the present invention comprises:

feed means for feeding an elongated film;

a perforating unit including a first block having a surface on which a large number of particles with acute corner portions and a Mohs hardness of 5 or more are deposited, a second block having a surface on which a desired protruding pattern is formed, and an elastic organic polymer sheet so arranged as to cover at least the protruding pattern of the second block, the first and second blocks being arranged such that the particle-deposited surface of the first block and the organic polymer sheet oppose each other, one of the first and second blocks is stationary, and the other block is arranged to be movable toward the stationary block; and pressurizing means for moving the movable block closer to the stationary block until the distance between projecting ends of the particles and the surface of a portion of the organic polymer sheet located on the protruding pattern becomes smaller than the thickness of the elongated film fed to a position between the movable and stationary blocks, thereby pressing the acute corner portions of the particles into the elongated film in a region opposing the protruding pattern.

Examples of the film are a general-purpose organic polymer film consisting of, e.g., polyethylene, polypropylene, polyethyleneterephthalate, polyester, polyvinyl chloride, a fluorine resin, or a polyamide; an engineering plastic film consisting of, e.g., polycarbonate or polyimide, and a superengineering plastic film consisting of, e.g., polyetheretherketone or polyetherketone; an elastomer film, organic polymer foam films having numerous closed cells, such as a polyethylene foam film, a foam film of an ethylene-vinyl acetate copolymer, a polystyrene foam film, a mixed foam film of polyethylene and polyvinyl acetate, and a polyurethane foam film, a heat-fusible organic polymer film, and foam paper; a composite film formed by mixing an inorganic powder, such as a silica powder, a carbon powder, or an alumina powder, in an organic polymer; a laminated film formed by laminating two or three organic polymer films made of different materials, a laminated film formed by laminating woven fabric, nonwoven fabric, or paper on an organic polymer film, a laminated film formed by laminating woven fabric, nonwoven fabric, or paper on an organic polymer foam film having numerous closed cells, and a laminated film formed by laminating a metal foil, such as an aluminum foil or a copper foil, on an organic polymer film; and metal films such as an aluminum film and a copper film.

Usually, a film with a thickness of 3.5 µm to 10 mm can be used as the above-mentioned film.

As the feed means for feeding the elongated film, a roll on which any of the above various films is wound can be used. If the elongated film is made from an organic polymer, a film manufacturing machine using an inflation method or a casting method can be used as the feed means.

The first block is constructed of iron or various hard alloys such as an iron-based alloy. The first block has on its surface a large number of particles with acute corner portions and a Mohs hardness of 5 or more. These particles are deposited on the surface by, e.g., an electro-deposition method or a bonding method using an organic or inorganic binder. It is desirable that a large number of these particles be deposited at an area ratio of 70% or more on the surface of the first block.

Examples of the particle with a Mohs hardness of 5 or more are a carbide alloy particle (e.g., a tungsten carbide particle), a silicon carbide particle, a boron carbide particle, a sapphire particle, a cubic boron nitride (CBN) particle, and a natural or synthetic diamond particle. In particular, a synthetic diamond particle with a high hardness and a high strength is desired. It is preferable to use particles with a particle size of 10 to 100 µm and a particle size variation of 5% or less.

If diamond particles are to be used as a large number of particles with a Mohs hardness of 5 or more, these diamond particles are preferably deposited on the surface of the first block by electro-deposition. Electro-deposition of the diamond particles onto the first block is done by a method including the steps of: degreasing the first block; masking surfaces of the first block except for the one opposing the second block; performing degreasing and washing with water; washing the block with an acid and with water; forming a hard plating layer consisting primarily of, e.g., nickel on the exposed surface of the first block and temporarily adhering a large number of diamond particles on the hard plating layer; performing a hard plating treatment for portions of the hard plating layer between the diamond particles such that acute corner portions of the diamond particles sufficiently protrude, thereby fixing the diamond particles to the block; and removing the masking material. In this electro-deposition, it is desirable that an Ni layer or a Cr layer be formed beforehand on the electro-deposition surface of the first block by using a plating technique or the like. By the use of such an electro-deposition technique, it is possible to deposit the diamond particles on the surface of the first block with an exceedingly high strength.

The first block may have the same shape as the final product (e.g., a packaging material for a deoxidizer or a desiccant, or an easily tearable packaging material).

The protruding pattern is formed by processing the surface of the second block, which is made of iron or various hard alloys such as an iron-based alloy, by a mechanical polishing method or a selective etching method using a mask. Ni plating or Cr plating can be performed on the surface on which the protruding pattern is formed.

The protruding pattern formed on the surface of the second block can be any of a grating pattern, a stripe pattern, and a pattern consisting of a plurality of separate circular projections or polygonal projections, e.g., triangular, rectangular, or hexagonal projections. This protruding pattern preferably has a height of 0.1 to 10 mm. If the height of the protruding pattern is smaller than 0.1 mm, it may become difficult to form non-through pores corresponding to the protruding pattern in the elongated film fed to a position between the organic polymer sheet under which the protruding pattern is located and a large number of particles on the surface of the first block. If the height of the protruding pattern is larger than 10 mm, the pattern becomes more susceptible to mechanical abrasion. Consequently, the shape of the protruding pattern may change after relatively short use periods. The height of the protruding pattern is more preferably 0.5 to 2.0 mm.

As the elastic organic polymer sheet to be coated on the surface of the protruding pattern of the second block, it is possible to use, e.g., rubber sheets such as a natural rubber sheet, a styrenebutadiene rubber sheet, an elastomer sheet, an urethane rubber sheet, a silicone rubber sheet, and a neoprene rubber sheet; and organic polymer foam sheets such as a polyurethane foam sheet, a polystyrene foam sheet, and a rubber-based foam sheet, e.g., an elastomer foam sheet.

The rubber sheet preferably has a thickness of 0.1 to 8 mm. If the thickness of the rubber sheet is less than 0.1 mm, the rubber sheet may break during perforation. If the thickness of the rubber sheet exceeds 8 mm, the elasticity during perforation of the elongated film deteriorates, and this makes it difficult to form a large number of non-through pores corresponding to the protruding pattern. The thickness of the rubber sheet is more preferably 0.5 to 5 mm. It is particularly preferable that the thickness of the rubber sheet be chosen within the above thickness range (0.1 to 8 mm) in accordance with the height of the protruding pattern. That is, it is preferable to choose a thin rubber sheet if the height of the protruding pattern is small, and a thick rubber sheet if the height of the pattern is large.

It is favorable that the organic polymer foam sheet have a thickness of 1 to 15 mm. If the thickness of the organic foam sheet is smaller than 1 mm, the organic foam sheet may break during perforation. If the thickness of the organic foam sheet is larger than 15 mm, the elasticity during perforation of the elongated film decreases to make it difficult to form a large number of non-through pores corresponding to the protruding pattern. A more preferred thickness of the organic foam sheet is 1 to 10 mm. It is particularly desirable that the thickness of the organic foam sheet be selected within the above thickness range (1 to 15 mm) in accordance with the height of the protruding pattern; that is, it is preferable to select a thin organic foam sheet if the protruding pattern is low, and a thick organic foam sheet if the pattern is high.

As the pressurizing means, it is possible to use, e.g., an air cylinder, a hydraulic cylinder, or a cylinder using a servo motor as a driving source.

A destaticizing means can be arranged in the subsequent stage of the perforating unit. As this destaticizing means, it is possible to use a belt having grounded metal fibers or a device constituted by a vessel containing pure water and an ultrasonic generating member for applying ultrasonic waves to the pure water.

The porous film manufacturing apparatus according to the present invention with the above arrangement can regularly form a large number of non-through pores with a small pore size of sub-μm to several tens μm at a high density in elongated films made of various materials including polymeric materials and metals, with almost no deterioration in the essential characteristics (in the case of a polymeric-material film, for example, softness and strength) of the film materials.

More specifically, the present inventors have developed and put into practical use a porous film manufacturing apparatus comprising an elongated film feed means, a perforating unit including a first block on the surface of which a large number of particles (e.g., synthetic diamond particles) having acute corner portions and a Mohs hardness of 5 or more are deposited and a second block, and a pressurizing means for moving one (e.g., the first block) of the first and second blocks toward the other block (the second block) until the distance between projecting ends of the particles deposited on the first block and the surface of the second block becomes smaller than the thickness of the elongated film fed to a position between the movable and fixed blocks. This porous film manufacturing apparatus is described in Japanese Patent Disclosure (Kokai) No. 6-71767 laid open for public inspection on Jun. 3, 1994. In the porous film manufacturing apparatus with this structure, an elongated film is fed to a position between the first and second blocks, and the pressurizing means pressurizes the first block toward the second block. Consequently, the acute corner portions of the large number of diamond particles deposited on the surface of the first block opposing the second block are pressed into the elongated film. As a result, a large number of non-through pores with a fine opening width of sub-μm to several tens μm are formed in the elongated film.

The perforating unit of this manufacturing apparatus is assembled by smoothening the opposing surfaces of the first and second blocks, depositing a large number of diamond particles on the smoothened surface of the first block by, e.g., electro-deposition, and arranging the smoothened surface of the second block to be parallel to the first block. In this assembly of the perforating unit, even after the surface of the second block opposing the first block is smoothened, strains on the order of μm to ten-odd μm remain in some cases from a microscopic viewpoint. Likewise, strains on the order of μm to ten-odd μm may also remain in the first block on which the large number of diamond particles are deposited. Therefore, if an elongated film is perforated using the manufacturing apparatus incorporating this perforating unit, the diamond particles deposited on the first block may not be pressed into portions of the elongated film located at the strains of the first and second blocks and consequently non-through pores may not be formed in these portions. In the case where diamond particles having a particle size of 40 to 50 μm are electro-deposited on the first block at a density of, for example, about 53,000 particles/cm$^2$, the number of non-through pores formed in the elongated film is only about 60% of the number of diamond particles.

The porous film manufacturing apparatus according to the present invention comprises a perforating unit including a first block having a surface on which a large number of particles (e.g., diamond particles) with acute corner portions and a Mohs hardness of 5 or more are deposited, a second block having a surface on which a desired protruding pattern is formed, and an elastic organic polymer sheet so arranged as to cover at least the protruding pattern surface of the second block. The first and second blocks are arranged such that the diamond-particle-deposited surface of the first block and the organic polymer sheet oppose each other, one of the first and second blocks is stationary, and the other block is arranged to be movable toward the stationary block. In this perforating unit, the elongated film is fed to a position between the diamond-particle-deposited surface of the first block and the elastic organic polymer sheet which covers the protruding pattern (e.g., a grating-like protruding pattern) of the second block. Thereafter, the pressurizing means moves the first block toward the second block until the distance between the surface of a portion of the organic polymer sheet located on the protruding pattern and projecting ends of the diamond particles becomes smaller than the thickness of the elongated film and a desired gap is formed between them, thereby pressurizing the elongated film. As described above, the protruding pattern is formed on the surface of the second block opposing the first block, and the elastic organic polymer sheet is so formed as to cover this protruding pattern. Therefore, even if strains on the order of μm to ten-odd μm are present in the first and second blocks, the elastic organic polymer sheet functions to reduce these strains during the pressurization. As a consequence, the acute corner portions of the large number of diamond particles deposited on the first block are uniformly pressed into the elongated film in a region of the organic polymer sheet in which the protruding pattern is positioned, thereby mechanically perforating the film. This makes it possible to form a certain regular pattern, e.g., a grating pattern of a large number of non-through pores with a fine opening width of sub-μm to several tens μm in the elongated film in correspondence with the protruding pattern. In other words, even if strains on the order of μm to ten-odd μm are present in the first and second blocks, the formation density of non-through pores with a fine opening width can be significantly increased since all of the large number of diamond particles of the first block opposing the protruding pattern are pressed into the elongated film to contribute to perforation. In the case where diamond particles having a particle size of 40 to 50 μm are electro-deposited on the first block at a density of, for example, about 53,000 particles/cm$^2$, non-through pores are formed in those parts of the elongated film which opposes the protruding pattern, at the same density of, i.e., about 53,000 pores/cm$^2$. In addition, the formation density of the non-through pores with respect to the elongated film can be readily controlled by the shape of the protruding pattern on the surface of the second block.

Also, the above process of perforation is done by the mechanical force of the diamond particles deposited on the first block. This makes it possible to regularly form a large number of non-through pores with a fine opening width with almost no deterioration in the essential characteristics (in the case of an organic polymer film, for example, softness and strength) of the material of the elongated film.

Furthermore, by replacing the second block of the perforating unit with one having another protruding pattern, a large number of non-through pores with a fine opening width can be formed in an elongated film with a high density and a distribution form corresponding to the shape of this new protruding pattern. Additionally, the depth of a large number of non-through pores to be formed in the elongated film can be adjusted by changing the thickness or the material of the elastic organic polymer sheet.

By applying the perforating operation performed by the manufacturing apparatus as discussed above to elongated films made of the materials or having the structures explained below, porous films for use in various applications can be obtained.

(1) By forming a large number of regular (patterned) non-through pores with a fine opening width in organic polymer films, e.g., a polypropylene film such as a biaxially oriented polypropylene (OPP) film or a casting polypropylene film, a polyethylene (PE) film, and a polyethyleneterephthalate (PET) film, by using the above perforating unit, it is possible to obtain functional films which have no liquid permeability but are accurately controlled in oxygen gas permeability, carbon dioxide gas permeability and vapor permeability due to the thin film portion of the film located below the non-through pores.

More specifically, these functional films can be used as a packaging medium for keeping the freshness of vegetables and fruits. That is, when a vegetable or fruit is sealed with a packaging medium, the oxygen concentration decreases and the carbon dioxide concentration increases inside the packaging medium due to the respiration of the vegetable or fruit itself. Consequently, the respiration is discouraged under the low-oxygen, high-carbon-dioxide conditions, and this keeps the freshness of the vegetable or fruit. In this case, the gas permeability of a film as the material of the packaging medium is required to allow permeation of a minimum necessary quantity of oxygen with which an individual vegetable or fruit can normally respire to maintain its life, to control the concentration of carbon dioxide produced by the respiration in order to prevent excess carbon dioxide, and to prevent occurrence of moisture condensation which causes breeding of bacteria.

In this porous organic polymer film, a large number of non-through pores with a fine opening width are formed regularly at an accurate density in an organic polymer film. Therefore, it is possible to control at a high accuracy the permeation amounts of oxygen, carbon dioxide, and water vapor by the dissolution and diffusion of gases in the film material in the thin film portion of the film located below the non-through pores. For this reason, a packaging material manufactured from this porous organic polymer film has a good function of keeping the freshness of vegetables and fruits.

(2) By forming regular (patterned) non-through pores with a fine opening width in a film consisting of a fluorine resin, such as polytetrafluoroethylene, by using the perforating unit discussed above, it is possible to obtain an air-cell oxygen permeable film whose oxygen gas permeation amount is controlled with a high accuracy by the thin film portion of the film located below the non-through pores formed regularly. An air cell incorporating this oxygen permeable film is largely improved in life due to an excellent oxygen permeation amount controlling function of the oxygen permeable film.

(3) By preparing an elongated laminated film by laminating a second film constructed from, e.g., polyethyleneterephthalate on a first film constructed from, e.g., polyethylene or polypropylene, and processing this elongated laminated film by using the above perforating unit such that the second film opposes the diamond-deposited surface of the first block, it is possible to manufacture a porous laminated film in which a large number of non-through pores with a fine opening width are regularly formed from the second film to the first film. Note that through pores are formed in the second film. A porous laminated film of this sort has a high water pressure resistance (a high water permeability resistance) and therefore can be suitably used as an inexpensive packaging material with oxygen permeability and vapor permeability for a desiccant or a deoxidizer.

(4) By forming a large number of non-through pores with a fine opening width in the form of lines in an OPP film or a PET film by using the perforating unit discussed above, and laminating the resultant film on a heat-fusible resin film, such as a polyethylene film, with an adhesive, it is possible to obtain a packaging material which can be easily torn along the non-through pores formed in lines. Also, by forming a large number of non-through pores with a fine opening width in the form of lines in an OPP film or a PET film, on which aluminum is vapor-deposited, from the film side by using the above perforating unit, and laminating the resultant film on a heat-fusible resin film, such as a polyethylene film, with an adhesive such that the thin aluminum film is in contact with the resin film, it is possible to obtain a packaging material which can be easily torn along the non-through pores formed in lines.

Another porous film manufacturing apparatus according to the present invention comprises:

feed means for feeding an elongated film;

a perforating unit including a first rotatable roll having a surface on which the large number of particles with acute corner portions and a Mohs hardness of 5 or more are deposited, a second roll having a circumferential surface on which a desired protruding pattern is formed and rotatable in a direction opposite to a rotating direction of the first roll, and an elastic organic polymer sheet so arranged as to cover at least the protruding pattern of the second roll, the first and second rolls being arranged to oppose each other; and pressurizing means for pressurizing the first and second rolls against each other so that the distance between projecting ends of the particles and the surface of a portion of the organic polymer sheet located on the protruding pattern becomes smaller than the thickness of the elongated film fed to a position between the first and second rolls, thereby pressing the acute corner portions of the particles into the elongated film in a region opposing the protruding pattern.

As the elongated film, films similar to those discussed earlier can be used.

As the feed means for feeding the elongated film, a roll on which any of the above-mentioned various films is wound can be used. If the elongated film is made from an organic polymer, a film manufacturing machine using an inflation method or a casting method can be used as the feed means.

The first roll has a metal roll main body and the large number of particles having acute corner portions and a Mohs hardness of 5 or more. These particles are deposited on the surface of the roll main body by, e.g., an electro-deposition method or a bonding method using an organic or inorganic binder. It is desirable that the large number of these particles be deposited at an area ratio of 70% or more on the surface of the first roll.

The metal roll main body is constructed of iron or an iron alloy. The roll main body can also be a member made of iron or an iron alloy and having a nickel plating layer or a chromium plating layer on its surface.

Examples of the particle with a Mohs hardness of 5 or more are a carbide alloy particle (e.g., a tungsten carbide particle), a silicon carbide particle, a boron carbide particle, a sapphire particle, a cubic boron nitride (CBN) particle, and a natural or synthetic diamond particle. In particular, a synthetic diamond particle with a high hardness and a high strength is desired. It is preferable to use particles with a particle size of 10 to 100 μm and a particle size variation of 5% or less.

If diamond particles are to be used as the large number of particles with a Mohs hardness of 5 or more, these diamond particles are preferably deposited on the surface of the roll main body by electro-deposition. Electro-deposition of the diamond particles onto the roll main body is done by a method including the steps of: degreasing the roll main body; masking the end portions of the surface and the shaft of the roll main body; performing degreasing and washing with water; washing the roll main body with an acid and with water; forming a hard plating layer consisting primarily of, e.g., nickel on the exposed surface of the roll main body and temporarily adhering the large number of diamond particles on the hard plating layer; performing a hard plating treatment for portions of the hard plating layer between the diamond particles such that acute corner portions of the diamond particles sufficiently protrude, thereby fixing the diamond particles to the roll main body; and removing the masking material. In this electro-deposition, it is desirable that a Ni layer or a Cr layer be formed beforehand on the electro-deposition surface of the roll main body by using a plating technique or the like. By the use of such an electro-deposition technique, it is possible to deposit the diamond particles on the surface of the roll main body with an exceedingly high strength.

The protruding pattern on the circumferential surface of the second roll is formed by processing the surface of a roll main body consisting of iron or an iron alloy by a mechanical polishing method or a selective etching method using a mask. Ni plating or Cr plating can be performed on the surface on which the protruding pattern is formed.

The protruding pattern formed on the surface of the second roll main body can be any of a grating pattern, a stripe pattern, and a pattern consisting of a plurality of separate circular projections or polygonal projections, e.g., triangular, rectangular, or hexagonal projections. This protruding pattern preferably has a height of 0.1 to 10 mm. If the height of the protruding pattern is smaller than 0.1 mm, it may become difficult to form non-through pores corresponding to the protruding pattern in the elongated film fed to a position between the organic polymer sheet under which the protruding pattern is located and the large number of particles on the surface of the first roll. If the height of the protruding pattern is larger than 10 mm, the pattern becomes more susceptible to mechanical abrasion. Consequently, the shape of the protruding pattern may change after relatively short use periods. The height of the protruding pattern is more preferably 0.5 to 2.0 mm.

As the elastic organic polymer sheet to be coated on the surface of the protruding pattern of the second roll, it is possible to use, e.g., rubber sheets such as a natural rubber sheet, a styrenebutadiene rubber sheet, an elastomer sheet, an urethane rubber sheet, a silicone rubber sheet, and a neoprene rubber sheet; and organic polymer foam sheets such as a polyurethane foam sheet, a polystyrene foam sheet, and a rubber-based foam sheet, e.g., an elastomer foam sheet.

The rubber sheet preferably has a thickness of 0.1 to 8 mm. If the thickness of the rubber sheet is less than 0.1 mm, the rubber sheet may break during perforation. If the thickness of the rubber sheet exceeds 8 mm, the elasticity during perforation of the elongated film decreases, and this makes it difficult to form the large number of non-through pores corresponding to the protruding pattern. The thickness of the rubber sheet is more preferably 0.5 to 5 mm. It is particularly preferable that the thickness of the rubber sheet be chosen within the above thickness range (0.1 to 8 mm) in accordance with the height of the protruding pattern. That is, it is preferable to choose a thin rubber sheet if the height of the protruding pattern is small, and a thick rubber sheet if the height of the pattern is large.

It is favorable that the organic polymer foam sheet have a thickness of 1 to 15 mm. If the thickness of the organic foam sheet is smaller than 1 mm, the organic foam sheet may break during perforation. If the thickness of the organic foam sheet is larger than 15 mm, the elasticity during perforation of the elongated film decreases to make it difficult to form the large number of non-through pores corresponding to the protruding pattern. A more preferred thickness of the organic foam sheet is 1 to 10 mm. It is particularly desirable that the thickness of the organic foam sheet be selected within the above thickness range (1 to 15 mm) in accordance with the height of the protruding pattern; that is, it is preferable to select a thin organic foam sheet if the protruding pattern is low, and a thick organic foam sheet if the pattern is high.

It is desirable that the above perforating unit be constituted by the first and second rolls, shafts inserted to extend through the centers of these rolls, and boxes incorporating bearings for axially supporting portions near the two ends of each shaft.

The first and second rolls constituting the perforating unit can be aligned either horizontally or vertically. Also, either of the first or second roll and both rolls can be made movable.

The pressurizing means desirably includes pushing means arranged in the boxes near the two ends of the shaft of one of the first and second rolls to push this roll toward the other roll, and cushioning members, such as springs, for absorbing the gap produced between the first and second rolls due to variations in the thickness of a film passing between them. It is desirable that the first roll be fixed, the second roll be arranged to be movable with respect to the first roll, and the pushing means and the cushioning members be arranged in the boxes near the two ends of the second roll to push the second roll toward the first roll.

Two or more such perforating units each equipped with the pressurizing means can be arranged in the direction of conveyance of the elongated film. For example, when two such units are to be arranged in this way, the large number of particles with a Mohs hardness of 5 or more, deposited on the first roll of the first unit and on the first roll of the second unit, can have different particle sizes. Also, when two units are to be used, after being passed between the first and second rolls of the first unit, an elongated film can be passed between the first and second rolls of the second unit such that the surface away from the perforated surface of the film is brought into contact with the first roll (the roll on which particles with a Mohs hardness of 5 or more are deposited), thereby perforating both the upper and lower surfaces of the film.

The perforating unit can have a third roll arranged on the side of the first roll away from the side on which the second roll is arranged and rotatable in a direction opposite to the rotating direction of the first roll.

The third roll desirably has a structure in which a shaft extends through the center of the roll and boxes incorporating bearings for axially supporting the shaft are arranged near the two ends of the shaft. It is also desirable that a pressurizing means identical with the pressurizing means discussed above be provided to the boxes near the two ends of the shaft of the third roll, thereby pushing the third roll toward the first roll.

When the third roll is added to the perforating unit, it is desirable that the first roll be arranged to be movable, i.e., free to move a desired distance between the second and third rolls, so that either the second or third roll can be pushed toward the first roll by the pressure control means.

In this arrangement, it is possible to employ (1) a form in which the elongated film is also passed between the third and first rolls so that perforation is performed not only between the first and second rolls but between the first and third rolls, and (2) a form in which the third roll is used as a roll to be pushed toward the first roll.

When form (1) is employed, a roll identical with the second roll, i.e., a roll on the surface of which a protruding pattern is formed and which is covered with an elastic organic polymer sheet is used as the third roll.

When form (2) is employed, a common metal roll or a metal roll whose surface is covered with an organic polymer layer made of, e.g., rubber or a synthetic resin, is used as the third roll.

A destaticizing means can be arranged in the subsequent stage of the perforating unit. As this destaticizing means, it is possible to use a belt having grounded metal fibers or a device constituted by a vessel containing pure water and an ultrasonic generating member for applying ultrasonic waves to the pure water.

This porous film manufacturing apparatus according to the present invention with the above arrangement can regularly and continuously form the large number of non-through pores with a fine opening width of sub-μm to several tens μm at a high density in elongated films made of various materials including polymeric materials and metals, with almost no deterioration in the essential characteristics (in the case of a polymeric-material film, for example, softness and strength) of the film materials.

More specifically, the present inventors have developed a porous film manufacturing apparatus comprising an elongated film feed means, a perforating unit including a first rotatable roll on the surface of which the large number of particles (e.g., synthetic diamond particles) having acute corner portions and a Mohs hardness of 5 or more are deposited and a second roll rotatable in a direction opposite to the rotating direction of the first roll, and a pressurizing means arranged near the two ends of a movable one of the two rolls of the perforating unit to control the pressure applied to the elongated film fed to a position between the first and second rolls. The present inventors have filed this porous film manufacturing apparatus in, e.g., Japan, the United States (Ser. No. 07/703,827), and EPC. In the porous film manufacturing apparatus with this structure, an elongated film is fed to a portion between the first and second rolls. The pressurizing means pressurizes one (e.g., the first roll) of the two rolls toward the other (the second roll) until the distance between the projecting ends of the large number of the particles (e.g., diamond particles) deposited on the first roll and the surface of the second roll becomes smaller than the thickness of the elongated film, and at the same time the first and second rolls are rotated in the opposite directions. Consequently, the acute corner portions of the large number of diamond particles deposited on the surface of the first roll are pressed into the elongated film which is continuously fed. As a result, the large number of non-through pores with a fine opening width of sub-μm to several tens μm are continuously formed in the elongated film.

The perforating unit of this manufacturing apparatus is assembled by smoothening the surfaces of the first and second rolls, depositing the large number of diamond particles on the smoothened surface of the roll main body of the first roll by, e.g., electro-deposition, and arranging the second roll to be parallel to the first roll. In this assembly of the perforating unit, even after the surfaces of the first and second rolls are smoothened, these rolls have strains on the order of μm to ten-odd μm in some cases from a microscopic viewpoint. Therefore, if an elongated film is perforated using the manufacturing apparatus incorporating this perforating unit, the diamond particles deposited on the first roll may not be pressed into portions of the elongated film located at the strains of the first and second rolls and consequently non-through pores may not be formed in these portions. In the case where diamond particles having a particle size of 40 to 50 μm are electro-deposited on the first roll at a density of, for example, about 53,000 particles/cm², the number of non-through pores formed in the elongated film is only about 60% of the number of diamond particles.

The porous film manufacturing apparatus according to the present invention comprises a perforating unit which includes a first rotatable roll on the surface of which the large number of particles (e.g., diamond particles) having acute corner portions and a Mohs hardness of 5 or more are deposited, a second roll rotatable in a direction opposite to the rotating direction of the first roll, and an elastic organic polymer sheet so arranged as to cover at least the protruding pattern formation surface of the second roll, and in which the first and second rolls are arranged to oppose each other. In this perforating unit, the elongated film is fed to a position between the diamond-particle-deposited surface of the first roll and the elastic organic polymer sheet which covers the protruding pattern (e.g., a grating-like protruding pattern) of the second roll. Thereafter, the pressurizing means moves the first and second rolls close to each other until the distance between the surface of a portion of the organic polymer sheet located on the protruding pattern and the projecting ends of the diamond particles becomes smaller than the thickness of the elongated film and a desired gap is formed between them, thereby pressurizing the elongated film. As described above, the protruding pattern is formed on the surface of the second roll, and the elastic organic polymer sheet is so formed as to cover this protruding pattern. Therefore, even if strains on the order of μm to ten-odd μm are present in the first and second rolls, the elastic organic polymer sheet functions to reduce these strains during the pressurization. As a consequence, acute corner portions of the large number of the diamond particles deposited on the first roll are uniformly pressed into the elongated film in a region of the organic polymer sheet in which the protruding pattern is positioned, thereby mechanically perforating the film. This makes it possible to form a certain regular pattern, e.g., a grating-like pattern of the large number of non-through pores with a fine opening width of sub-μm to several tens μm in the elongated film in correspondence with the protruding pattern. In other words, even if strains on the order of μm to ten-odd μm are present in the first and second rolls, the formation density of non-through pores with a fine opening width can be significantly increased since all of the large number of the diamond particles of the first roll opposing the protruding pattern are pressed into the elongated film to contribute to perforation. In the case where diamond particles having a particle size of 40 to 50 μm are electro-deposited on the first roll at a density of, for example, about 53,000 particles/cm², non-through pores are formed in those parts of the elongated film which opposes the protruding pattern, at the same density of, i.e., about 53,000 pores/cm². In addition, porous films in which non-through pores are regularly formed in this fashion can be manufactured with a high reproducibility.

Also, the above process of perforation is done by the mechanical force of the diamond particles deposited on the first roll. This makes it possible to regularly form the large number of non-through pores with a fine opening width with almost no deterioration in the essential characteristics (in the case of an organic polymer film, for example, softness and transparency) of the material of the elongated film.

Furthermore, by replacing the second roll of the perforating unit with one having another protruding pattern, the large number of non-through pores with a fine opening width can be formed in an elongated film with a density and a distribution form corresponding to the shape of this new protruding pattern. Additionally, the depth of the large number of non-through pores to be formed in the elongated film can be adjusted by changing the thickness or the material of the elastic organic polymer sheet.

By using this porous film manufacturing apparatus according to the present invention, therefore, it is possible to regularly form the large number of non-through pores with a fine opening width at a high density in an elongated film in correspondence with the protruding pattern formed on the second roll of the perforating unit. It is also possible to readily control the formation density of the non-through pores with respect to the elongated film in accordance with the shape of the protruding pattern on the surface of the second roll. This makes it possible to continuously mass-produce porous films suitable for, e.g., a packaging material for keeping the freshness of vegetables and fruits, an air-cell oxygen permeable film, a desiccant packaging material, a deoxidizer packaging material, and an easily tearable film.

Embodiments of the present invention will be described in detail below with reference to the accompanying drawings.

First Embodiment

Figure 4:
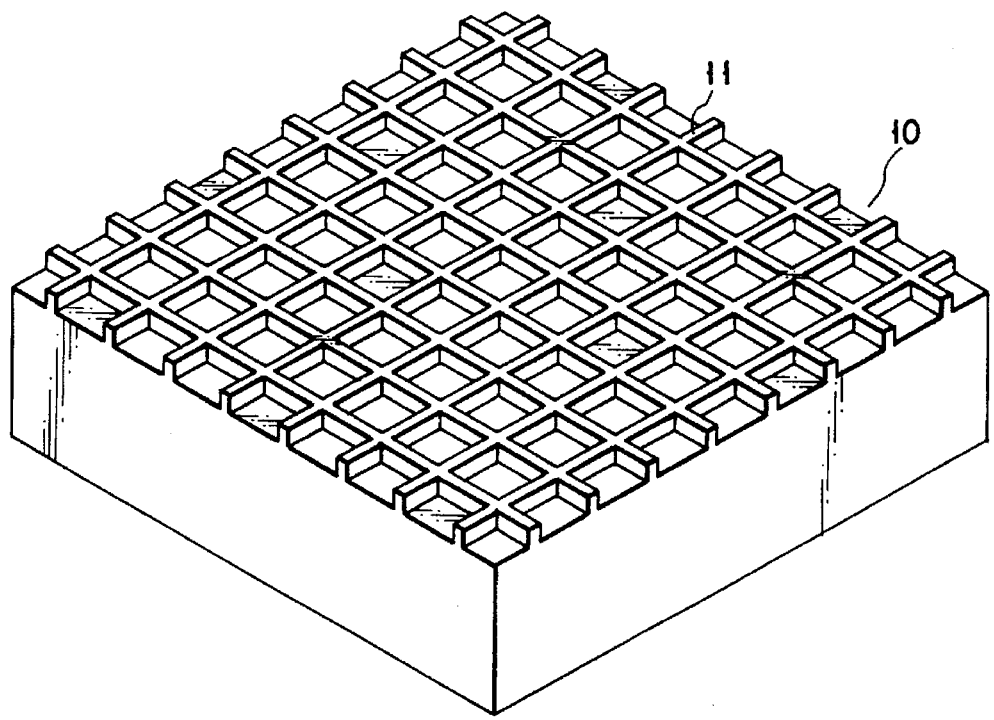
FIG. 4 is a perspective view in which a second block of the manufacturing apparatus in FIG. 1 is viewed from below.
Figure 5:
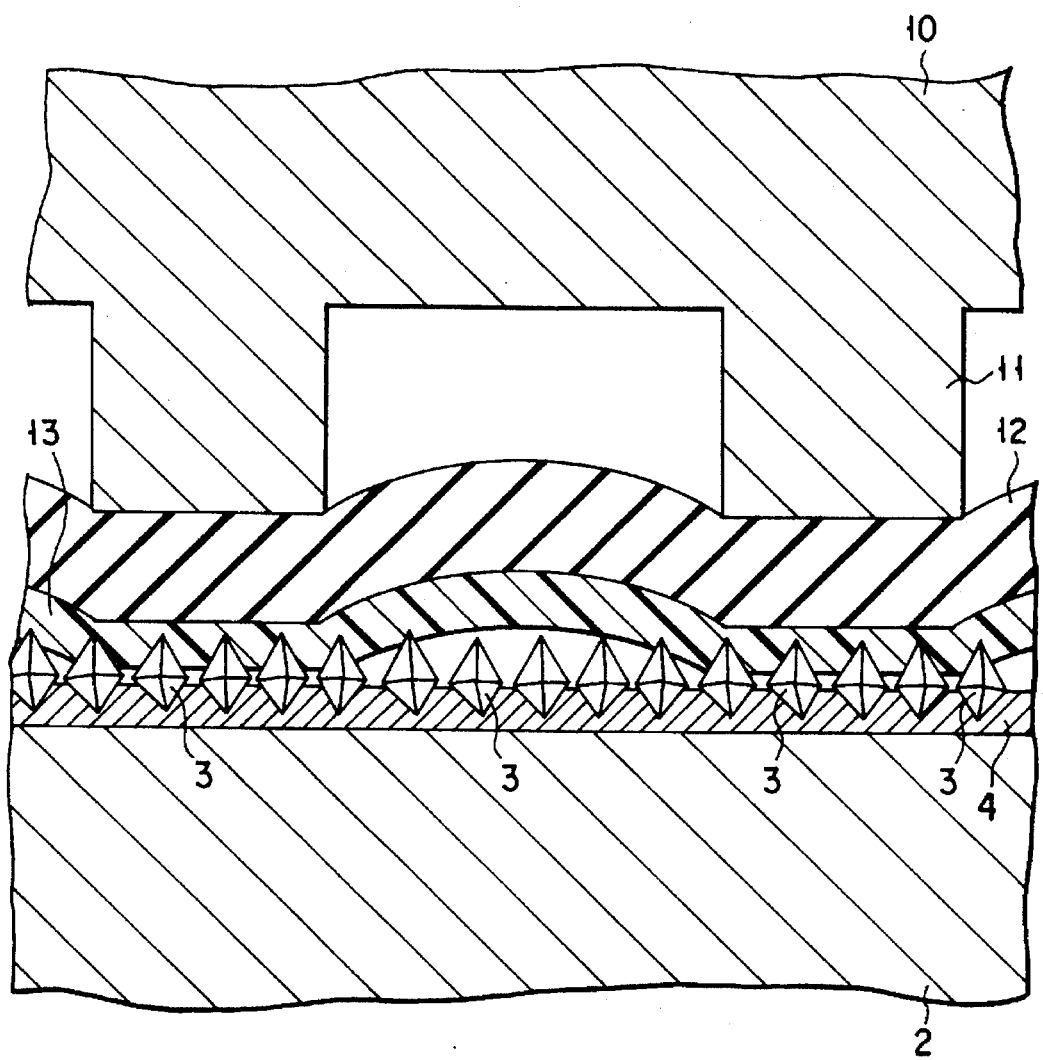
FIG. 5 is a sectional view showing the major parts when non-through pores are formed by the manufacturing apparatus in FIG. 1.

FIG. 1 is a schematic sectional view showing a porous film manufacturing apparatus of the first embodiment. FIG. 2 is a bottom view of the manufacturing apparatus in FIG. 1. FIG. 3 is a perspective view showing a first block used in the manufacturing apparatus in FIG. 1. FIG. 4 is a perspective view showing a second block viewed from below of the manufacturing apparatus in FIG. 1. FIG. 5 is a sectional view showing the main components when non-through pores are formed by the manufacturing apparatus in FIG. 1.

A first rectangular block 2 made of, e.g., iron, is embedded in a bed 1. On the upper surface of the first block 2, as in FIGS. 3 and 5, a large number of particles, e.g., synthetic diamond particles 3, having acute corners and a Mohs hardness of 5 or more are embedded and fixed in an electro-deposited layer 4 containing nickel as its main constituent, such that the corner portions of these particles sufficiently project. The synthetic diamond particles 3 have a particle size of, e.g., 50 to 60 μm, and are electro-deposited at a density of about 34,000 particles/cm² on the upper surface of the first block 2.

A plurality of (four in this case) struts 5 extend from the bed 1. A support plate 6 is fixed on the four struts 5. An air cylinder 8 which functions as a pressurizing means and has a piston rod 7 is supported by the support plate 6. The piston rod 7 extends downward through a hole 9 formed in the support plate 6.

A second rectangular block 10 made of, e.g., iron, is removably attached to the lower end of the piston rod 7. As in FIG. 4, a grating-like protruding pattern 11 is formed on the lower surface of the second block 10. An organic polymer sheet (e.g., a 5 mm thick urethane rubber sheet) 12 with elasticity is formed from the lower surface to the upper surface of the second block 10 so as to cover the protruding pattern 11.

A perforating unit is constituted by the first and second blocks 2 and 10 and the organic polymer sheet 12 which is coated on the protruding pattern 11 on the lower surface of the second block 10.

A supply roll (not shown) which operates as an elongated film intermittent feed means is arranged before the first block 2. An elongated film 13 of the supply roll is fed along the upper surface of the first block 2 via two feed rolls 14a and 14b and taken up by a take-up roll (not shown) via two feed rolls 15a and 15b after the first block 2.

An operation of the porous film manufacturing apparatus with the above arrangement will be described below.

First, the elongated film 13 consisting of, e.g., biaxially oriented polypropylene, is fed from the winding roll (not shown) along the upper surface of the first block 2 via the two feed rolls 14a and 14b and then via the two feed rolls 15a and 15b subsequent to the first block 2. Consequently, the leading end of the elongated film 13 is wound by the take-up roll (not shown).

After the leading end of the elongated film 13 is taken up by the take-up roll, the air cylinder 8 is operated to move the piston rod 7 downward. This moves the second block 10 attached to the lower end of the piston rod 7 toward the first block 2 until the distance between the projecting ends of the synthetic diamond particles 3 of the first block 2 and the surface of a portion of the organic polymer sheet 12 corresponding to the protruding pattern 11 of the second block 10 becomes smaller than the thickness of the elongated film 13, and a desired gap is formed between them. Consequently, the elongated film 13 is pressurized and perforated.

Figure 6:
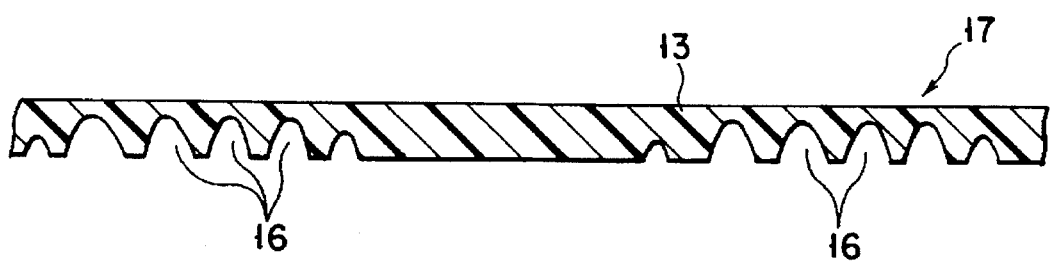
FIG. 6 is a sectional view showing a porous film obtained by the manufacturing apparatus in FIG. 1.

That is, as discussed above, the large number of synthetic diamond particles 3 having acute corner portions are deposited on the upper surface of the first block 2, and the protruding pattern 11 covered with the organic polymer sheet 12 is formed on the lower surface of the second block 10, the organic polymer sheet 12 contacting the protruding pattern 11 while remaining spaced from the surface of the second block 10 (FIG. 5). Therefore, by lowering the second block 10 to a predetermined position, as shown in FIG. 5, the elongated film 13 is pressurized between the surface of the portion of the organic polymer sheet 12 corresponding to the protruding pattern 11 and the large number of diamond particles 3. At this time, the elastic organic polymer sheet 12 positioned on the protruding pattern 11 functions to reduce strains on the order of μm to ten-odd μm occurring in the first and second blocks 2 and 10. As a result, the acute corner portions of the large number of synthetic diamond particles 3 deposited on the first block 2 are uniformly pressed into the elongated film 13 in a region of the organic polymer sheet 12 in which the protruding pattern 11 is located, thereby mechanically perforating the film. The result is, as in FIGS. 2 and 6, a porous film 17 in which a large number of non-through pores 16 are regularly formed in the elongated film 13 in correspondence with the grating-like protruding pattern 11. A very thin film corresponding to the gap mentioned above is formed in portions of the film 13 where the non-through pores 16 are formed. Also, the perforation is done by the mechanical force of the synthetic diamond particles 3 deposited on the first block 2. Therefore, a large number of non-through pores with a fine opening width (e.g., 40 to 50 μm) at the same density of, i.e., about 34,000 pores/cm$^2$ can be regularly formed in the parts of the elongated film 13 which opposes the protruding pattern 11, with almost no deterioration in the essential characteristics of the film material.

After the perforation is done, the air cylinder 8 is operated to raise the second block 10, the elongated film 13 is moved a distance corresponding to the width (the length of the side along the moving direction of the elongated film 13) of the first block 2, and an identical perforation is again executed.

In the manufacturing apparatus according to the first embodiment, during the perforation performed by the perforating unit, strains in the first and second blocks 2 and 10 can be reduced in the protruding pattern 11 by the organic polymer sheet 12. Consequently, the acute corner portions of the synthetic diamond particles 3 opposing the protruding pattern 11 can be uniformly pressed into the elongated film 13. This makes it possible to significantly increase the formation density of the non-through pores 16 in a portion opposing the protruding pattern 11.

In addition, the porous film manufacturing apparatus of the first embodiment, therefore, can regularly form a large number of non-through pores 16 with a fine opening width at a high density in the elongated film 13 in correspondence with the protruding pattern 11 formed on the second block 10 of the perforating unit. Consequently, the formation density of the non-through pores 16 with respect to the elongated film 13 can be readily controlled in accordance with the shape of the protruding pattern 11.

By replacing the second block 10 on which the protruding pattern 11 is formed with a block having another protruding pattern, it is possible to freely change the pattern shape of non-through pores with a fine opening width to be formed in the elongated film 13. As a consequence, porous films different in the formation densities of non-through pores can be manufactured without replacing the first block 2 which is expensive because the synthetic diamond particles are deposited on it. This results in a low manufacturing cost of porous films.

The depth of the non-through pores can be controlled by changing the material of the elastic organic polymer sheet. Consequently, it is possible to manufacture a porous film whose gas permeability or the like is controlled with a high accuracy.

More specifically, it was confirmed by the following experiment that it was possible to manufacture biaxially oriented polypropylene (OPP) films and polyethylene (PE) films having various different oxygen gas permeation amounts with a high reproducibility.

Experimental Example

Porous films in which patterns of non-through pores were formed were manufactured in accordance with the operation discussed above under the following conditions of the shapes of the first and second blocks 2 and 10, the size of the synthesized diamond particles electro-deposited on the first block 2, the shape of the protruding pattern of the second block 10, the type and shape of the organic polymer sheet 12 with elasticity, the pressure between the first and second blocks 2 and 10, and the thicknesses of OPP films and PE films used.

The shapes of the first and second blocks; an A4-size rectangular shape

The size of the synthetic diamond particles; average particle size=60 μm

Figure 7:
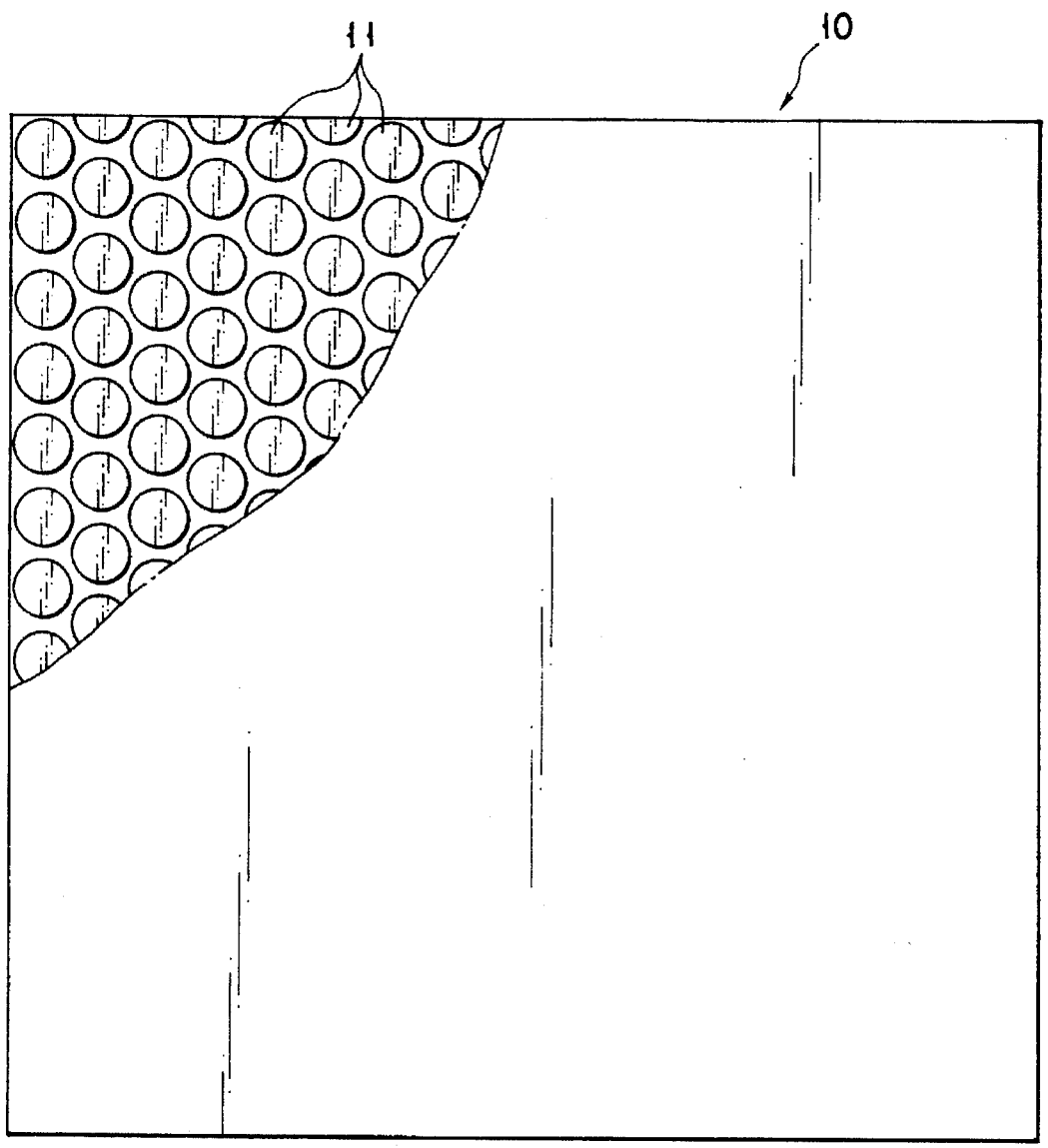
FIG. 7 is a bottom view showing a protruding pattern formed on another second block to be incorporated into the manufacturing apparatus in FIG. 1.
Figure 8:
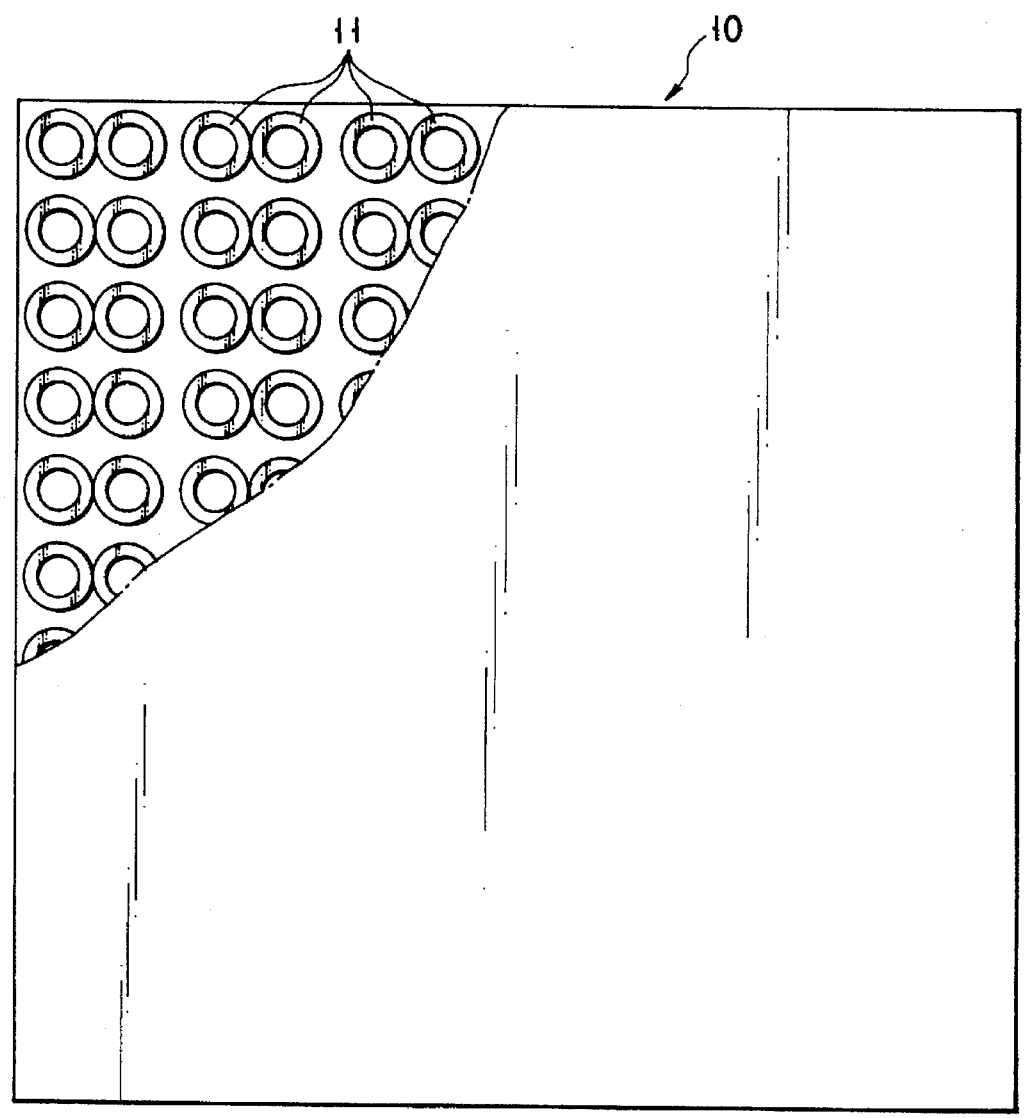
FIG. 8 is a bottom view showing a protruding pattern formed on still another second block to be incorporated into the manufacturing apparatus in FIG. 1.

The density of the synthetic diamond particles on the upper surface of the first block; about 34,000 particles/cm$^2$ The shape of the protruding pattern of the second block;
  a grating pattern shown in FIG. 4, height=0.5 mm, grating line width=4 mm, inner area of each grating unit=9 mm×9 mm,
  a pattern of circles shown in FIG. 7, height=0.5 mm, circle diameter=5 mm, circle interval=3 mm,
  a pattern of hollow circles shown in FIG. 8, height=0.5 mm, inner diameter=12 mm, outer diameter=20 mm, hollow circle interval=4 mm The type and shape of the elastic organic polymer sheet;
  A. a 10 mm thick urethane foam sheet,
  B. a 5 mm thick urethane rubber sheet with a hardness of 30,
  C. a 5 mm thick urethane rubber sheet with a hardness of 40

The pressure between the first and second blocks; 30 kg/cm$^2$, 20 kg/cm$^2$

The thickness of the OPP film; 25 μm

The thickness of the PE film; 45 μm

The oxygen gas permeation amount of each resultant porous film was measured. The results are listed in Table 1 below.

for the same protruding pattern, the permeation amount of oxygen gas or the like can be controlled more precisely by choosing foam sheets or rubber sheets of each different hardness as the elastic organic polymer sheet.

The manufacturing apparatus of the first embodiment as discussed above can manufacture porous films suitable for a packaging material for keeping the freshness of vegetables and fruits, an air-cell oxygen permeable film, a desiccant packaging material, a deoxidizer packaging material, and the like.

Note that, in the first embodiment described above, the first and second blocks are arranged in lower and upper portions, respectively, of the apparatus, and the second block is vertically moved. However, it is also possible to achieve similar effects as in the first embodiment by switching the positions of the first and second blocks.

Second Embodiment

Figure 9:
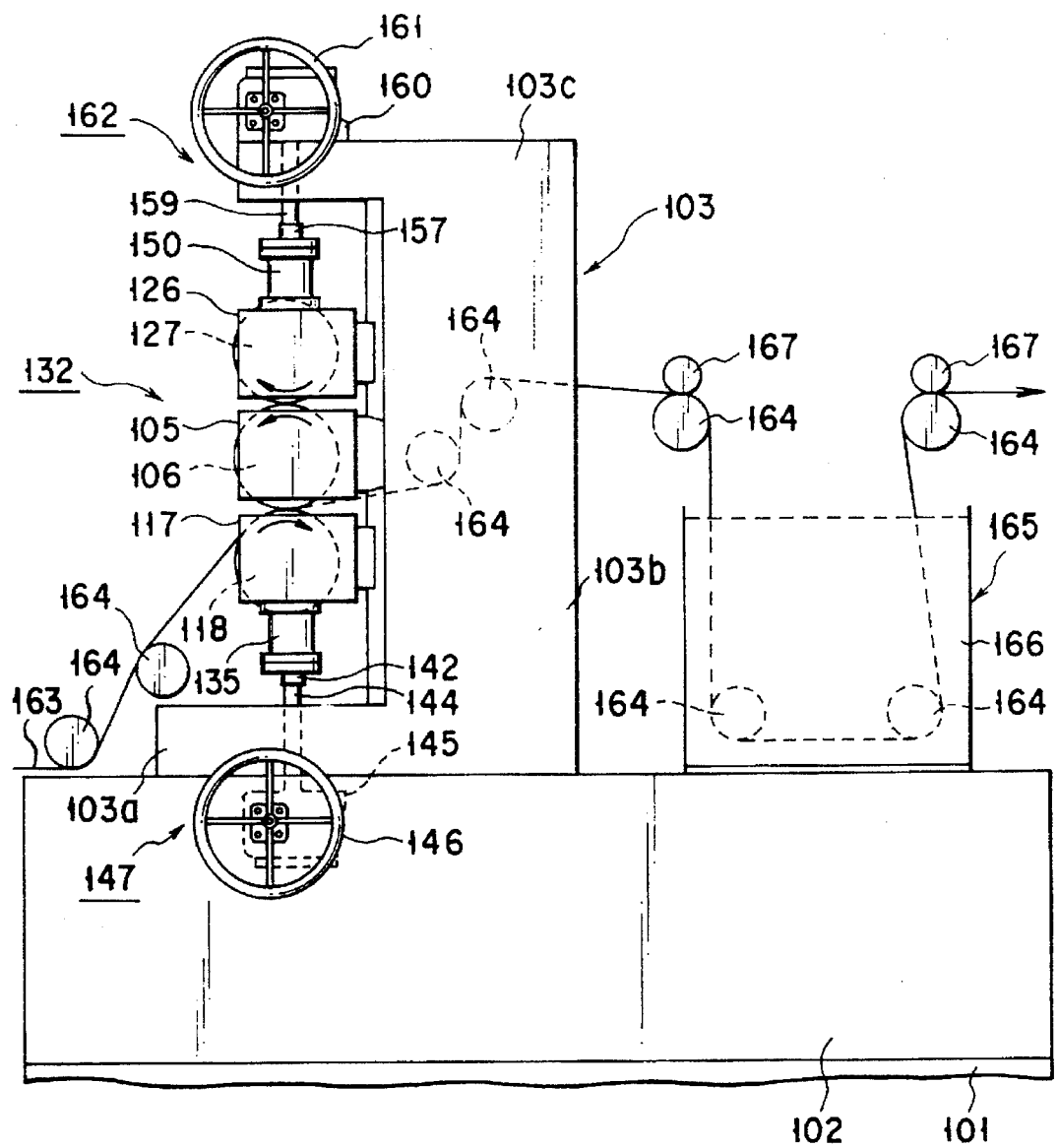
FIG. 9 is a front view showing a porous film manufacturing apparatus of the second embodiment.
Figure 10:
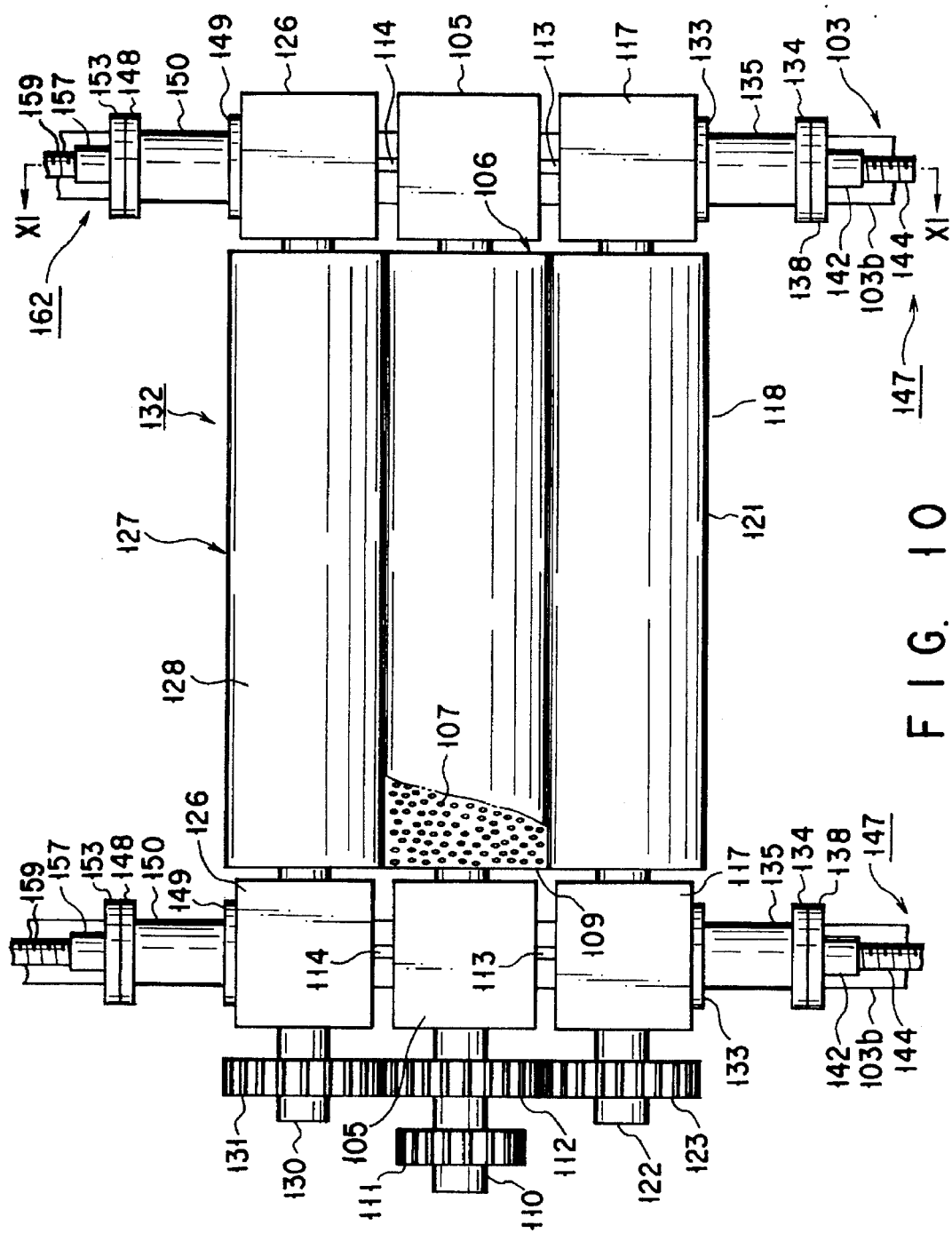
FIG. 10 is a side view showing the major components of the manufacturing apparatus in FIG. 9.
Figure 11:
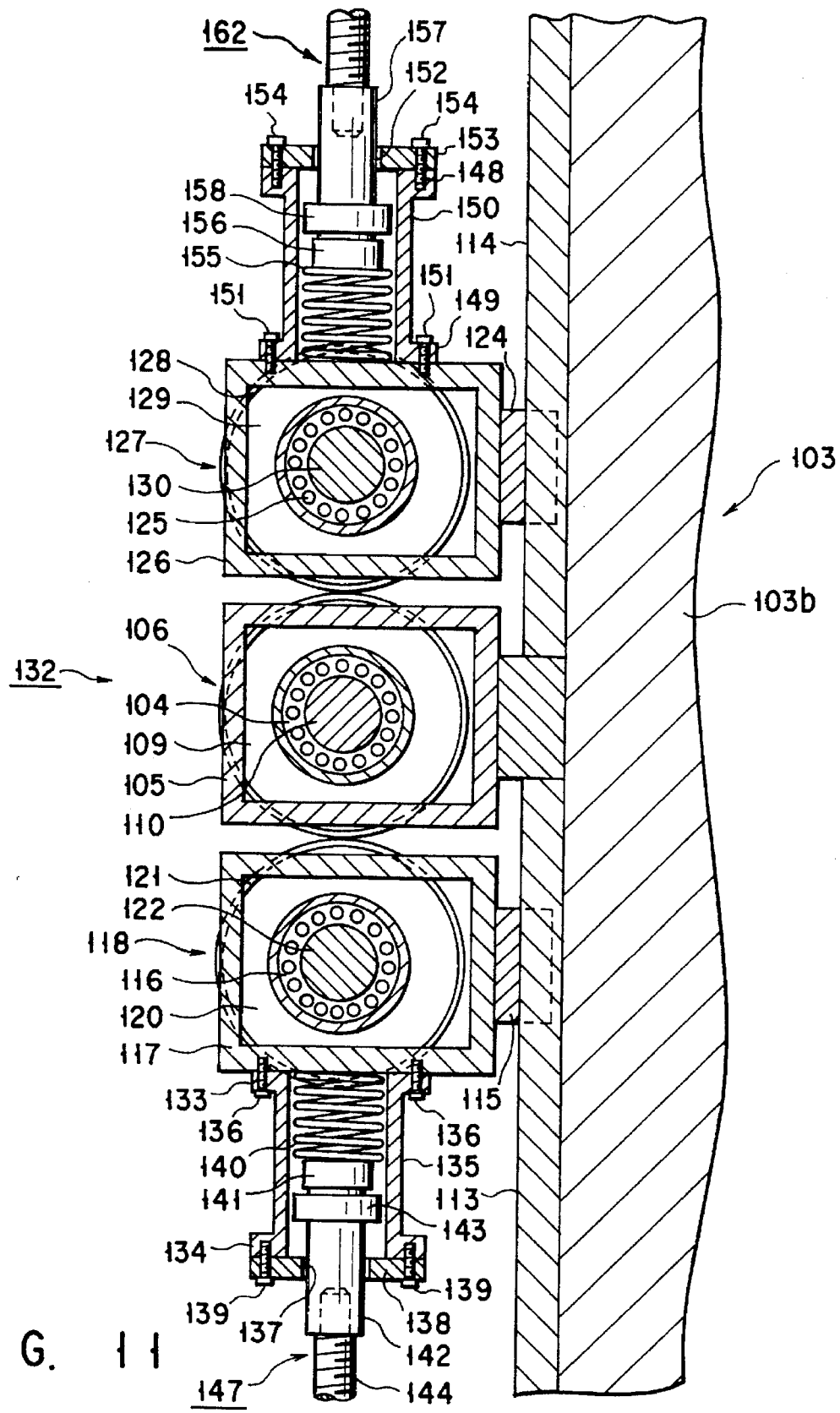
FIG. 11 is a sectional view taken along the line XI—XI in FIG. 9.
Figure 12:
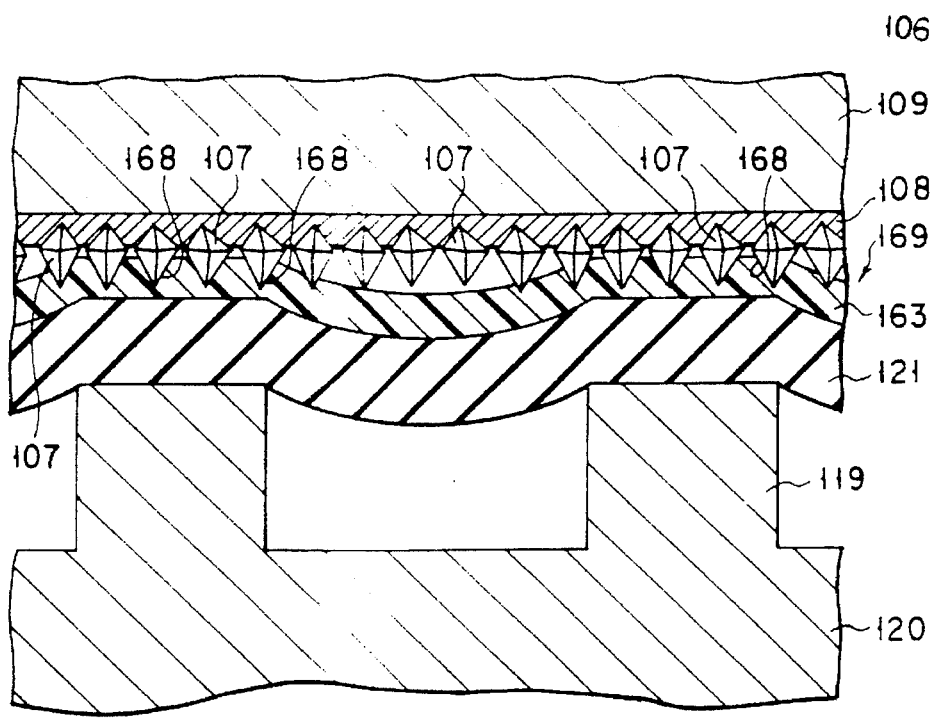
FIG. 12 is an enlarged sectional view showing first and second rolls and their peripheral portion of the manufacturing apparatus in FIG. 9.
Figure 13:
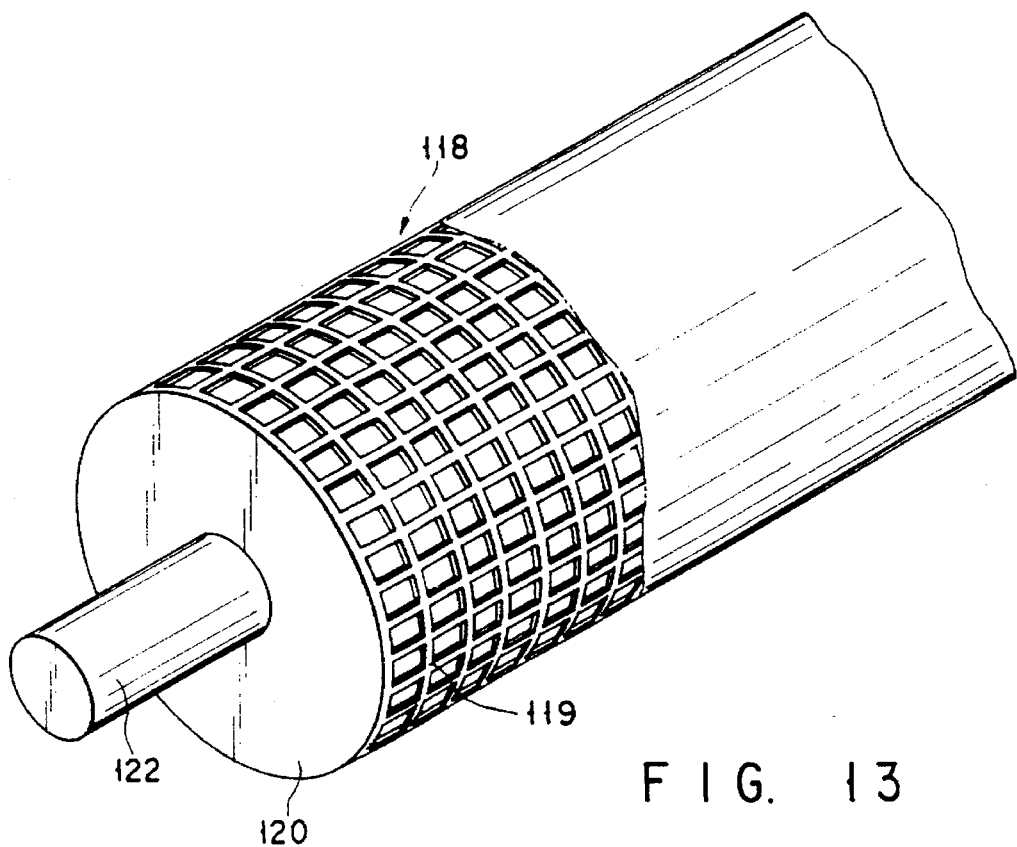
FIG. 13 is a perspective view showing the main parts of a second roll to be incorporated into the manufacturing apparatus in FIG. 9.

FIG. 9 is a front view showing a porous film manufacturing apparatus of the second embodiment. FIG. 10 is a side view showing the major parts of the manufacturing apparatus in FIG. 9. FIG. 11 is a sectional view taken along the line XI—XI in FIG. 10. FIG. 12 is an enlarged sectional view showing first and second rolls and their peripheral portion of the manufacturing apparatus in FIG. 9. FIG. 13 is a perspective view showing the main components of a second roll to be incorporated in the manufacturing apparatus in FIG. 9.

In FIG. 9, reference numeral 101 denotes a bed. A table 102 is provided on the upper surface of the bed 101 except for a portion near the right end of the bed. Two hook-shaped frames 103 are arranged on the table 102 with a predetermined distance between them in the direction of width of the

TABLE 1

| Shape of protruding pattern | Elastic organic polymer sheet | Press pressure*1 | Oxygen gas permeation amount*1 OPP | Oxygen gas permeation amount*1 PE | Press pressure*1 | Oxygen gas permeation amount*1 OPP | Oxygen gas permeation amount*1 PE |
|---|---|---|---|---|---|---|---|
| Grating pattern in FIG. 4 | (A) | 30 | 6 × 10$^7$ | 3 × 10$^5$ | 20 | 1 × 10$^4$ | 1 × 10$^4$ |
|  | (B) | 30 | 5 × 10$^7$ | 2.5 × 10$^5$ | 20 | 7 × 10$^3$ | 9 × 10$^3$ |
|  | (C) | 30 | 7 × 10$^6$ | 2 × 10$^5$ | 20 | 6 × 10$^3$ | 8 × 10$^3$ |
| Pattern of circles in FIG. 7 | (A) | 30 | 2 × 10$^7$ | 1 × 10$^7$ | 20 | 1 × 10$^5$ | 3 × 10$^5$ |
|  | (B) | 30 | 1.1 × 10$^7$ | 8 × 10$^6$ | 20 | 8 × 10$^4$ | 1 × 10$^5$ |
|  | (C) | 30 | 1 × 10$^7$ | 5 × 10$^6$ | 20 | 7 × 10$^4$ | 7 × 10$^4$ |
| Pattern of hollow circles in FIG. 8 | (A) | 30 | 4 × 10$^7$ | 1 × 10$^6$ | 20 | 1 × 10$^5$ | 3 × 10$^4$ |
|  | (B) | 30 | 3 × 10$^7$ | 4 × 10$^5$ | 20 | 7 × 10$^4$ | 1 × 10$^4$ |
|  | (C) | 30 | 2 × 10$^6$ | 3 × 10$^5$ | 20 | 5 × 10$^4$ | 7 × 10$^3$ |

*1: The press pressure is in kg/cm$^2$.
*2: The oxygen gas permeation amount is in cc/m$^2$ · 24 hr · 25° C.

As is apparent from Table 1, porous OPP films and porous PE films having different oxygen permeation amounts can be easily manufactured by changing the shape of the protruding pattern.

It is also evident from Table 1 that, for the same protruding pattern, porous OPP films and porous PE films different in oxygen permeation amount can be manufactured by changing the material of the elastic organic polymer sheet. In particular, it is possible to obtain porous OPP films and porous PE films with large oxygen permeation amounts by using an urethane foam sheet which is the softest material.

Furthermore, Table 1 shows that, for the same protruding pattern, the oxygen gas permeation amount can be increased in proportion to the pressure applied on a film.

As discussed above, the gas permeation amount of, e.g., oxygen gas, can be controlled by changing the shape of the protruding pattern formed on the second block. Additionally, table 102. Each frame 103 consists of a lower plate 103a, a side plate 103b, and an upper plate 103c. As shown in FIG. 11, first box 105 incorporating a bearing 104 is fixed to a portion near the middle portion of each frame 103. A first roll 106 is arranged between the frames 103. As illustrated in FIGS. 10 and 12, the first roll 106 consists of an iron roll main body 109 and a shaft 110. A large number of particles (e.g., synthetic diamond particles) 107 having a particle size of 50 to 60 μm, acute corner portions, and a Mohs hardness of 5 or more are fixed on the surface of the roll main body 109 by being embedded in an electro-deposited layer 108 containing nickel as its main constituent, such that their acute corner portions sufficiently project from the layer 108. The shaft 110 extends through the center of the main body 109 to protrude from the two end faces of the main body 109. The synthetic diamond particles 107 are electro-deposited at a density of about 34,000 particles/cm$^2$ on the roll main body 109. The two protruding end portions of the shaft 110 are axially supported by the bearings 104 in the first boxes 105. A portion of the shaft 110 at one end (e.g., the left end) of the first roll 106 extends through the box 105. This protruding portion of the shaft 110 is fitted in a gear 111 which meshes with the gear of the driving shaft of a motor (not shown). Therefore, the first roll 106 is rotated, e.g., clockwise when the motor is driven. A gear 112 is fitted on the protruding portion of the shaft 110 between the gear 111 and the left side surface of the box 105.

Rails 113 and 114 are formed on the side plate 103b of each frame 103 at positions below and above, respectively, the first box 105. As shown in FIG. 11, sliders 115 (only one is shown) are arranged on the lower rails 113 so as to be vertically movable along these rails 113. A second box 117 incorporating a bearing 116 is fixed to each slider 115 and thereby can move vertically along the rail 113. A second roll 118 is arranged between the frames 103. The second roll 118 is positioned below the first roll 106 so as to oppose it. As in FIGS. 12 and 13, the second roll 118 consists of a stainless-steel roll main body 120, an elastic organic polymer sheet (e.g., a 5 mm thick silicone rubber sheet) 121, and a shaft 122. A grating-like protruding pattern 119 is formed on the circumferential surface of the roll main body 120. The organic polymer sheet 121 is so formed as to cover the protruding pattern 119 of the main body 120, the organic polymer sheet 121 contacting the protruding pattern 119 while remaining spaced from the surface of the roll main body 120 (FIG. 12). The shaft 122 extends through the center of the roll main body 120 to protrude from the two end faces of the main body 120. The two protruding end portions of the shaft 122 are axially supported by the bearings 116 of the second boxes 117. A portion of the shaft 122 at one end (e.g., the left end) of the second roll 118 protrudes through the second box 117. This protruding portion of the shaft 122 is fitted in a gear 123 which meshes with the gear 112 of the shaft 110 of the first roll 106. Therefore, the second roll 118 can be moved vertically along the rails 113 by the second boxes 117 and the sliders 115. Also, when the motor rotates the shaft 110 of the first roll 106 clockwise, the shaft 122 with the gear 123 meshed with the gear 112 of the shaft 110 rotates counterclockwise, with the result that the second roll 118 rotates counterclockwise.

As illustrated in FIG. 11, sliders 124 (only one is shown) are arranged on the upper rails 114 so as to be vertically movable on these rails 114. A third box 126 incorporating a bearing 125 is fixed to each slider 124 and thereby can move vertically along the rail 114. A third roll 127 is arranged between the frames 103. The third roll 127 is positioned above the first roll 106 so as to oppose it. The third roll 127 consists of an iron roll main body 129 and a shaft 130. A polymeric resin layer 128 such as an urethane resin layer is coated on the surface of the roll main body 129. The shaft 130 extends through the center of the main body 129 to protrude from the two end faces of the main body 129. The two protruding end portions of the shaft 130 are axially supported by the bearings 125 of the third boxes 126. A portion of the shaft 130 at one end (e.g., the left end) of the third roll 127 protrudes through the third box 126. This protruding portion of the shaft 130 is fitted in a gear 131 which meshes with the gear 112 of the shaft 110 of the first roll 106. Therefore, the third roll 127 can be moved vertically along the rails 114 by the third boxes 126 and the sliders 124. Also, when the motor rotates the shaft 110 of the first roll 106 clockwise, the shaft 130 with the gear 131 meshed with the gear 112 of the shaft 110 rotates counterclockwise. As a consequence, the third roll 127 rotates counterclockwise.

A perforating unit 132 is constituted by the two frames 103, the two first boxes 105, the first roll 106, the two pairs of sliders 115 and 124, the two second boxes 117, the second roll 118, the two third boxes 126, and the third roll 127.

Cylindrical members 135 each having upper and lower flanges 133 and 134 are arranged on the lower walls of the two second boxes 117. As in FIG. 11, each cylindrical member 135 is fixed to the second box 117 by a plurality of screws 136 threadably engaged with the lower wall of the second box 117 through the upper flange 133. A disk 138 with a hole 137 at its center is arranged on the lower flange 134 of each cylindrical member 135. Each disk 138 is fixed by a plurality of screws 139 threadably engaged with the lower flange 134 through the disk 138. A coil spring 140 is housed in each cylindrical member 135 so as to apply an elastic force in the vertical direction. A rod 142 with a pressure sensor 141 attached to its upper end is inserted into each cylindrical member 135 through the hole 137 of the disk 138. Each pressure sensor 141 is in contact with the lower end of the coil spring 140 and thereby can sense the pressure applied on the coil spring 140 when the rod 142 is moved upward. A disk-like guide 143 for smoothly moving the rod 142 up and down is attached to a portion of each rod 142 below the sensor 141. A ball screw 144 is fitted in the lower end portion of each rod 142. These ball screws 144 extend through the lower plates 103a of the frames 103 to protrude into recessed portions (not shown) of the bed 101. Casings (only one is shown) 145 each incorporating a threaded engaging plate (not shown) are provided in the recessed portions. The engaging plate of each casing 145 is threadably engaged with the lower protruding end portion of the ball screw 144. A worm shaft (not shown) which engages with the lower protruding end portion of the ball screw 144 is horizontally inserted into each casing 145. Handles (only one is shown) 146 are attached to the ends on one side of these worm shafts. By rotating the handle 146, therefore, the ball screw 144 engaged with the worm shaft of the handle 146 rotates to raise (or lower) the rod 142 in which this ball screw 144 is fitted. When the rod 142 is moved downward a certain distance or more, the disk-like guide 143 attached to the rod 142 comes in contact with the inner surface of the disk 138 below the cylindrical member 135, moving the cylindrical member 135 downward. Consequently, the second box 117 fixed to the upper end of the cylindrical member 135 is moved down along the lower rail 113 by the slider 115.

A first pressurizing means 147 for controlling the pressure to a film passing between the first and second rolls 106 and 118 is constituted by the two cylindrical members 135, the two disks 138, the two coil springs 140, the two pressure sensors 141, the two rods 142, the two disk-like guides 143, the two ball screws 144, the two casings 145, the two worm shafts (not shown), and the two handles 146.

Cylindrical members 150 each having upper and lower flanges 148 and 149 are arranged on the upper walls of the two third boxes 126. As shown in FIG. 11, each cylindrical member 150 is fixed to the third box 126 by a plurality of screws 151 threadably engaged with the upper wall of the third box 126 through the lower flange 149. A disk 153 with a hole 152 at its center is arranged on the upper flange 148 of each cylindrical member 150. Each disk 153 is fixed by a plurality of screws 154 threadably engaged with the upper flange 148 through the disk 153. A coil spring 155 is so housed in each cylindrical member 150 as to apply an elastic force in the vertical direction. The lower end of each coil spring 155 is in contact with the upper wall of the third box 126. A rod 157 with a pressure sensor 156 attached to its lower end is inserted into each cylindrical member 150 through the hole 152 of the disk 153. Each pressure sensor 156 is in contact with the upper end of the coil spring 155 and thereby can sense the pressure applied on the coil spring 155 when the rod 157 is lowered. A disk-like guide 158 for allowing a smooth vertical motion of the rod 157 is attached to a portion of each rod 157 above the sensor 156. A ball screw 159 is fitted in the upper end portion of each rod 157. These ball screws 159 protrude upward through the upper plates 103c of the frames 103. Casings (only one is shown) 160 each incorporating a threaded engaging plate (not shown) are provided on the upper surfaces of the upper plates 103c. The upper protruding end portion of each ball screw 159 is threadably engaged with the engaging plate of the casing 160. A worm shaft (not shown) which engages with the upper protruding end portion of the ball screw 159 is horizontally inserted into each casing 160. Handles (only one is shown) 161 are attached to the ends on one side of these worm shafts. Therefore, by rotating the handle 161, the ball screw 159 engaged with the worm shaft of the handle 161 rotates to raise (or lower) the rod 157 in which this ball screw 159 is fitted. When the rod 157 is raised a certain distance or more, the disk-like guide 158 attached to the rod 157 comes in contact with the inner surface of the disk 153 above the cylindrical member 150, moving the cylindrical member 150 upward. Consequently, the third box 126 fixed to the lower end of the cylindrical member 150 is raised along the rail 114 by the slider 124.

A second pressurizing means 162 for controlling the pressure to a film passing between the first and third rolls 106 and 127 is constituted by the two cylindrical members 150, the two disks 153, the two coil springs 155, the two pressure sensors 156, the two rods 157, the two disk-like guides 158, the two ball screws 159, the two casings 160, the two worm shafts (not shown), and the two handles 161.

A winding roll (not shown) of an elongated film is arranged before the perforating unit 132. An elongated film 163 of the winding roll is fed to positions between the first and second rolls 106 and 118 and between the first and third rolls 106 and 127 of the perforating unit 132 via a plurality of feed rolls 164. A destaticizing means 165 is arranged after the unit 132. This destaticizing means 165 is placed on the table 102 and includes a vessel 166 containing pure water and an ultrasonic generating member (not shown) for applying ultrasonic waves to the pure water. The feed rolls 164 are arranged between the unit 132 and the destaticizing means 165 and inside and after the vessel 166 to convey the elongated film 163 passing between the first and second rolls 106 and 118 (or between the first and third rolls 106 and 127). Note that abutment rolls 167 are provided for the two feed rolls 164 located before and after the vessel 166. A plurality of hot air blasting members (not shown) for drying the film 163 passing between the feed roll 164 and the abutment roll 167 and a take-up roll (not shown) are arranged in sequence in subsequent stages of the destaticizing means 165.

An operation of forming non-through pores by passing an elongated film between the first and second rolls 106 and 118 of the perforating unit 132 of the porous film manufacturing apparatus with the above arrangement will be described below with reference to FIGS. 9 to 14.

By rotating the two handles 146 of the first pressurizing means 147, e.g., counterclockwise, the second boxes 117 of the perforating unit 132, which are coupled with the upper ends of the cylindrical members 135, are moved down along the rails 113 of the frames 103 by the sliders 115. Consequently, the second roll 118 axially supported by the bearings 116 of the second boxes 117 is separated a sufficient distance from the first roll 106. Also, by rotating the two handles 161 of the second pressurizing means 162, e.g., clockwise, the third boxes 126 coupled with the lower ends of the cylindrical members 150 are moved up along the rails 114 of the frames 103 by the sliders 124. This separates the third roll 127 axially supported by the bearings 125 of the third boxes 126 from the first roll 106 by a sufficient distance. In this state, the elongated film 163 made of, e.g., polyethylene, is fed from the winding roll (not shown) and passed between the first and second rolls 106 and 118 of the unit 132 by the two feed rolls 164. Thereafter, the elongated film 163 is passed through the vessel 166 of the destaticizing means 165 by the plurality of feed rolls 164. The film 163 is then passed through the plurality of hot air blasting members (not shown), and the leading end of the film is wound around the take-up roll (not shown).

After the leading end of the elongated film 163 is taken up by the take-up roll, the two handles 146 of the first pressurizing means 147 are rotated clockwise. Consequently, the second boxes 117 coupled to the upper ends of the cylindrical members 135 are raised along the rails 113 of the frames 103 by the sliders 115. This brings the silicone rubber sheet 121, which corresponds to the protruding pattern 119 of the second roll 118 axially supported by the bearings 116 of the second boxes 117, into contact with the first roll 106 above the second roll 118. Additionally, by rotating the handles 146 in the same direction, the coil springs 140 are compressed by the sensors 141 at the upper ends of the rods 142. Upon compression of the coil springs 140, a pressure is applied to the lower walls of the second boxes 117, increasing the pressure between the second roll 118 axially supported by the bearings 116 of the second boxes 117 and the first roll 106. This pressure (compressing force) between the second and first rolls 118 and 106 is detected by the pressure sensors 141, and the forward and reverse rotations of the individual handles 146 are controlled in accordance with the detection results. As a result, the pressure to the elongated film 163 is controlled such that the distance between the first and second rolls 106 and 118, i.e., the distance between the projecting ends of the diamond particles 107 deposited on the circumferential surface of the first roll 106 and a portion of the silicone rubber sheet 121 corresponding to the protruding pattern 119 of the second roll 118 becomes smaller than the thickness of the elongated film 163, and a desired gap is formed between them. By this pressure control to the unit 132 by the first pressurizing means 147, the pressure is applied to the elongated film 163 between the first and second rolls 106 and 118, completing the preparation of perforation.

After the preparation of perforation is completed, the ultrasonic generating member (not shown) applies ultrasonic waves to the pure water contained in the vessel 166 of the destaticizing means 165. Subsequently, the take-up roll is rotated and at the same time the driving shaft of the motor (not shown) is also rotated. This rotation is transmitted from the gear of the driving shaft to the gear 111 of the shaft 110 of the first roll 106, rotating the first roll 106 clockwise. Upon rotation of the first roll 106, the second roll 118 is rotated counterclockwise by transmission of the rotation from the gear 112 of the shaft 110 to the gear 123 of the shaft 122 of the second roll 118. Since the third roll 127 is separated upward an enough distance from the first roll 106, the gear 131 of the shaft 130 of the third roll 127 is disengaged from the gear 112 of the shaft 110 of the first roll 106. Therefore, the third roll 127 is not driven by the rotation of the motor, i.e., is free to rotate. Upon rotation of the first and second rolls 106 and 118 in this fashion, a large number of non-through pores are formed in the elongated film 163 passing between the rolls 106 and 118.

Figure 14:
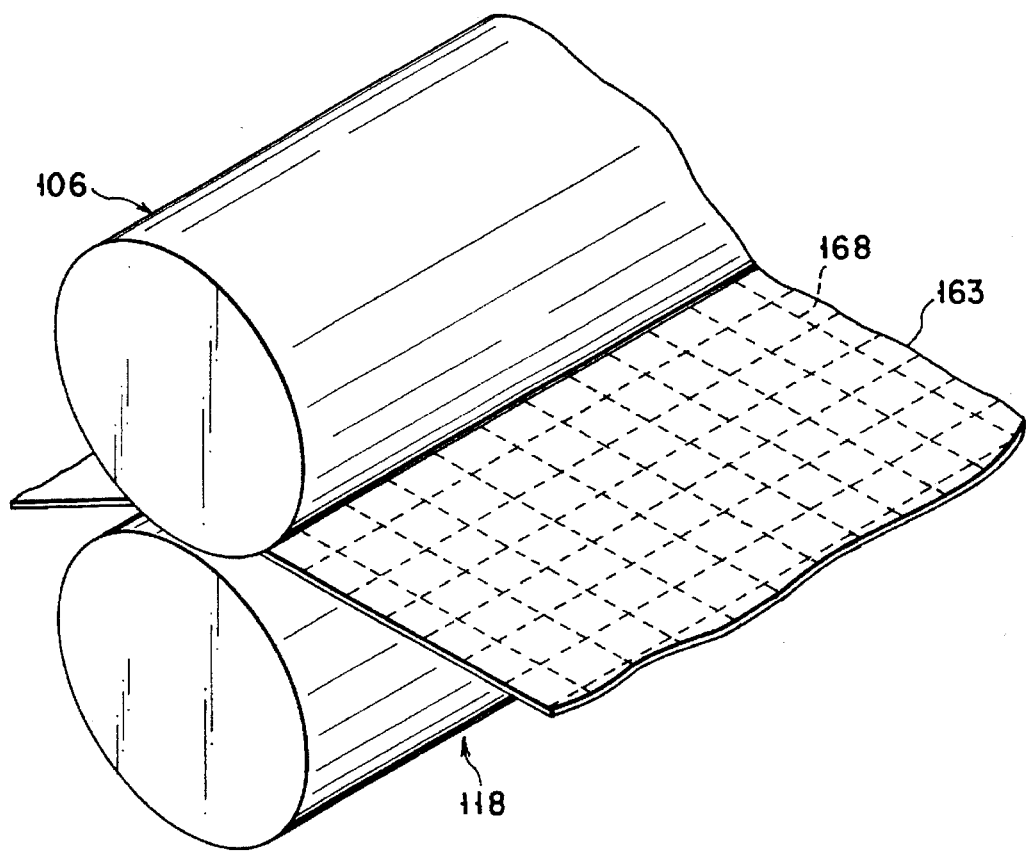
FIG. 14 is a schematic perspective view showing the step of forming a grating-like pattern of a large number of non-through pores in an elongated film by using the manufacturing apparatus of the second embodiment.

That is, as illustrated in FIG. 10, the first roll 106 includes the iron roll main body 109 on the surface of which the synthetic diamond particles 107 with acute corner portions are electro-deposited at a density of about 34,000 particles/$cm^2$. In addition, the second roll 118 includes the roll main body 120 on the circumferential surface of which the grating-like protruding pattern 119 is formed, and which is covered with the organic polymer sheet 121 with elasticity. As discussed above, the pressurizing means 147 pressurizes the second roll 118 toward the first roll 106 until the distance between the surface of a portion of the organic polymer sheet 121 corresponding to the protruding pattern 119 and the projecting ends of the synthetic diamond particles 107 becomes smaller than the thickness of the elongated film 163, and at the same time the rolls 106 and 118 are rotated in the opposite directions. As a consequence, as in FIG. 12, the elongated film 163 is pinched between the surface of the portion of the organic polymer sheet 121 corresponding to the protruding pattern 119 and the acute corner portions of the large number of synthetic diamond particles 107. At this time, a portion of the elastic organic polymer sheet 121 located on the protruding pattern 119 functions to reduce strains on the order of μm to ten-odd μm present in the first and second rolls 106 and 118. Consequently, the acute corner portions of the large number of synthetic diamond particles 107 electro-deposited on the first roll 106 are uniformly pressed into the elongated film 163 in a region of the organic polymer sheet 121 in which the protruding pattern 119 is located, thereby mechanically perforating the film 163. Therefore, as depicted in FIG. 14, it is possible to continuously obtain a porous film 169 in which a large number of non-through pores 168 are regularly formed in the elongated film 163 in correspondence with the grating-like protruding pattern 119. A very thin film corresponding to the gap discussed above is formed in portions of the elongated film 163 at which the non-through pores 168 are positioned, as in FIG. 12. The perforation described above is done by the mechanical force of the synthetic diamond particles 107 deposited on the roll main body 109 of the first roll 106. This makes it possible to regularly form a large number of non-through pores with a fine opening width (e.g., 40 to 50 μm) at the same density of, i.e., about 34,000 pores/$cm^2$ in the parts of the elongated film 163 opposing the protruding pattern 119, with almost no deterioration in the essential characteristics of the film material.

The elongated film 163 thus perforated by the unit 132 is conveyed through the vessel 166 of the destaticizing means 165 by the plurality of rolls 164 and the two abutment rolls 167. The perforation to the elongated film 163 by the unit 132 is done primarily by friction between the first and second rolls 106 and 118. Therefore, a large quantity of static electricity is generated on the surface of the perforated film 163 to attract surrounding dust. The dust adhered to the perforated elongated film 163 can be readily washed away by passing the film 163 through the vessel 166, which contains pure water, of the destaticizing means 165, and by applying ultrasonic waves to the pure water by the ultrasonic generating member (not shown). The elongated film 163 in which a large number of non-through pores are formed and from which dust is washed away in this manner is passed through the plurality of hot air blasting members (not shown), removing water from the surface of the film by evaporation. The elongated film 163 is then taken up by the take-up roll.

In the manufacturing apparatus according to the second embodiment, during the perforation performed by the perforating unit 132, strains in the first and second rolls 106 and 118 can be reduced in the protruding pattern 119 by the organic polymer sheet 121. Consequently, the acute corner portions of the synthetic diamond particles 107 opposing the protruding pattern 119 can be uniformly pressed into the elongated film 163. This makes it possible to significantly increase the formation density of the non-through ports 168 in a portion opposing the protruding pattern 119.

In addition, the porous film manufacturing apparatus of the second embodiment can regularly form a large number of non-through pores 168 with a fine opening width at a high density in the parts of the elongated film 163 opposing the protruding pattern 119 formed on the second roll 118 of the perforating unit 132. As a result, the formation density of the non-through pores 168 with respect to the elongated film 163 can be readily controlled in accordance with the shape of the protruding pattern 119.

By replacing the second roll on which the protruding pattern 119 is formed with a roll having another protruding pattern, it is possible to freely change the pattern shape of non-through pores with a fine opened width to be formed in the elongated film 163. As a consequence, porous films different in the formation density of non-through pores can be manufactured without replacing the first roll which is expensive because the synthetic diamond particles are deposited on it. This results in a low manufacturing cost of porous films.

Furthermore, the depth of the non-through pores can be controlled by changing the material of the elastic organic polymer sheet 121. Consequently, it is possible to manufacture a porous film whose gas permeability or the like is controlled with a high accuracy.

The manufacturing apparatus of the second embodiment as discussed above can manufacture porous films suitable for a packaging material for keeping the freshness of vegetables and fruits, an air-cell oxygen permeable film, a desiccant packaging material, a deoxidizer packaging material, and the like.

Note that, in the manufacturing apparatus of the second embodiment, the pressurizing means is constituted by the cylindrical members, disks, coil springs, pressure sensors, rods, disk-like guides, ball screws, casings, worm shafts, and handles. However, the present invention is not limited to this arrangement. For example, air cylinders or hydraulic cylinders can be used instead of the ball screws, casings, worm shafts, and handles for vertically moving the rods, or the ball screws can be driven by servo motors. It is also possible to omit the pressure sensors as the components of the pressurizing means. However, it is desirable to incorporate the sensors in order to perform perforation with a higher accuracy.

Also, in the manufacturing apparatus of the second embodiment, the first roll is stationary, and the second roll is pressurized toward the first roll by the first pressurizing means 147. However, the present invention is not limited to this arrangement. As an example, both the first and second rolls can be arranged to be movable in the direction of arrangement, and a structure which pulls the rolls such that the rolls move closer to each other can be used as the pressurizing means.

In the porous film manufacturing apparatus according to the present invention as has been discussed above, a large number of regular (patterned) non-through pores with a fine opening width of sub-μm to several tens μm can be formed at a high density in elongated films made of various materials including organic polymers and metals, with almost no deterioration in the essential characteristics (in the case of an organic polymer film, for example, softness and strength) of the film materials.

Additionally, by replacing the second block (or the second roll) on which a desired protruding pattern is formed or replacing the elastic organic polymer sheet covering the protruding pattern, a large number of non-through pores of a different pattern shape (arrangement) or depth can be formed in an elongated film made of an organic polymeric material or the like. This allows highly accurate control of the permeation amount of a gas. Consequently, it is possible to manufacture porous films suitable for, e.g., a packaging material for keeping the freshness of vegetables and fruits, an air-cell oxygen permeable film, a desiccant packaging material, and a deoxidizer packaging material in which the permeation amount of a gas, e.g., oxygen gas, is controlled with a high accuracy, without replacing the first block (or the first roll) which is expensive because particles with a Mohs hardness of 5 or more, such as synthetic diamond particles, are deposited on it. This also can reduce the cost of the apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A porous film manufacturing apparatus comprising:
   feed means for feeding an elongated film;
   a perforating unit including a first block having a surface on which a large number of particles with acute corner portions and a Mohs hardness of not less than five are deposited, a second block having a surface on which a desired protruding pattern is formed, and an elastic organic polymer sheet so arranged as to cover at least said protruding pattern of said second block, said elastic organic polymer sheet contacting said protruding pattern while remaining spaced from said surface of said second block, said first and second blocks being arranged such that said particle-deposited surface of said first block and said organic polymer sheet oppose each other, one of said first and second blocks is stationary, and the other block is arranged to be movable toward said stationary block; and
   pressurizing means for moving said movable block toward said stationary block until a distance between projecting ends of said particles and a surface of a portion of said organic polymer sheet located on said protruding pattern becomes smaller than a thickness of said elongated film fed to a position between said movable and stationary blocks, thereby pressing said acute corner portions of said particles into said elongated film in a region opposing said protruding pattern, wherein the surface of the elongated film contacting the organic polymer sheet is not perforated or substantially impressed by the protruding pattern of the second block.

2. The apparatus according to claim 1, wherein said particles are natural diamond particles.

3. The apparatus according to claim 1, wherein said particles are synthetic diamond particles.

4. The apparatus according to claim 2, wherein said diamond particles on the surface of said first block are electro-deposited particles so as to expose said acute corner portions.

5. The apparatus according to claim 1, wherein said protruding pattern has a height of 0.1 to 10 mm.

6. The apparatus according to claim 1, wherein said organic polymer sheet is a rubber sheet.

7. The apparatus according to claim 6, wherein said rubber sheet is made of urethane rubber.

8. The apparatus according to claim 6, wherein said rubber sheet is made of silicone rubber.

9. The apparatus according to claim 6, wherein said rubber sheet has a thickness of 0.5 to 8 mm.

10. The apparatus according to claim 1, wherein said organic polymer sheet is an organic polymer foam sheet.

11. The apparatus according to claim 10, wherein said organic polymer foam sheet is made of urethane foam.

12. The apparatus according to claim 10, wherein said organic polymer foam sheet has a thickness of 1 to 15 mm.

13. A porous film manufacturing apparatus comprising:
    feed means for feeding an elongated film;
    a perforating unit including a first rotatable roll having a surface on which a large number of particles with acute corner portions and a Mohs hardness of not less than five are deposited, a second roll having a circumferential surface on which a desired protruding pattern is formed and rotatable in a direction opposite to a rotating direction of said first roll, and an elastic organic polymer sheet so arranged as to cover at least said protruding pattern of said second roll, said elastic organic polymer sheet contacting said protruding pattern while remaining spaced from said circumferential surface of said second roll, said first and second rolls being arranged to oppose each other; and
    pressurizing means for pressurizing said first and second rolls against each other so that a distance between projecting ends of said particles and a surface of a portion of said organic polymer sheet located on said protruding pattern becomes smaller than a thickness of said elongated film fed to a position between said first and second rolls, thereby pressing said acute corner portions of said particles into said elongated film in a region opposing said protruding pattern, wherein the surface of the elongated film contacting the organic polymer sheet is not perforated or substantially impressed by the protruding pattern of the second roll.

14. The apparatus according to claim 13, wherein said particles are natural diamond particles.

15. The apparatus according to claim 13, wherein said particles are synthetic diamond particles.

16. The apparatus according to claim 14, wherein said diamond particles on the surface of said first roll are electro-deposited particles so as to expose acute corner portions.

17. The apparatus according to claim 13, wherein said protruding pattern has a height of 0.1 to 10 mm.

18. The apparatus according to claim 13, wherein said organic polymer sheet is a rubber sheet.

19. The apparatus according to claim 18, wherein said rubber sheet is made of urethane rubber.

20. The apparatus according to claim 18, wherein said rubber sheet is made of silicone rubber.

21. The apparatus according to claim 18, wherein said rubber sheet has a thickness of 0.5 to 8 mm.

22. The apparatus according to claim 13, wherein said organic polymer sheet is an organic polymer foam sheet.

23. The apparatus according to claim 22, wherein said organic polymer foam sheet is made of urethane foam.

24. The apparatus according to claim 22, wherein said organic polymer foam sheet has a thickness of 1 to 15 mm.

25. The apparatus according to claim 3, wherein said diamond particles on the surface of said first block are electro-deposited particles so as to expose said acute corner portions.

26. The apparatus according to claim 15, wherein said diamond particles on the surface of said first roll are electro-deposited particles so as to expose said acute corner portions.

* * * * *